United States Patent
Gschwind

(10) Patent No.: US 10,241,769 B2
(45) Date of Patent: *Mar. 26, 2019

(54) MARKING SIBLING CALLER ROUTINES

(71) Applicant: INTERNATIONAL BUSINESS MACHINES CORPORATION, Armonk, NY (US)

(72) Inventor: Michael K. Gschwind, Chappaqua, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/378,134

(22) Filed: Dec. 14, 2016

(65) Prior Publication Data

US 2018/0165091 A1   Jun. 14, 2018

(51) Int. Cl.
*G06F 8/41* (2018.01)
*G06F 8/54* (2018.01)

(52) U.S. Cl.
CPC ............. *G06F 8/54* (2013.01); *G06F 8/443* (2013.01)

(58) Field of Classification Search
CPC .......... G06F 8/54; G06F 8/41; G06F 9/44521; G06F 9/4481
USPC ........................................ 717/140, 151, 159
See application file for complete search history.

(56) References Cited

U.S. PATENT DOCUMENTS

| | | | |
|---|---|---|---|
| 5,182,807 A | 1/1993 | Mizuse | |
| 5,428,793 A | 6/1995 | Odnert et al. | |
| 5,555,417 A | 9/1996 | Odnert et al. | |
| 5,845,118 A | 12/1998 | Gheith | |
| 6,487,713 B1 | 11/2002 | Cohen et al. | |
| 6,934,935 B1 | 8/2005 | Bennett | |
| 7,430,586 B2 | 9/2008 | Bradshaw et al. | |
| 7,684,964 B2 | 3/2010 | Outhred et al. | |
| 7,890,543 B2 | 2/2011 | Hunt et al. | |
| 8,239,836 B1 | 8/2012 | Franz et al. | |
| 8,285,263 B2 | 10/2012 | Roundtree et al. | |
| 8,464,230 B2 | 6/2013 | Ansari | |
| 8,717,915 B2 | 5/2014 | Dubut et al. | |
| 9,021,511 B1* | 4/2015 | Gschwind | G06F 8/70 719/331 |

(Continued)

FOREIGN PATENT DOCUMENTS

WO   WO0123998 A1   4/2001

OTHER PUBLICATIONS

Andreas Bauer, "Compilation of Functional Programming Languages using GCC—Tail Calls", Jan. 15, 2003, retrieved from <http://www.immerundewig.at/thesis/baueran_thesis.pdf>, total pages 134. (Year: 2003).*

(Continued)

*Primary Examiner* — Marina Lee

(74) *Attorney, Agent, or Firm* — Steven Chiu, Esq.; Blanche E. Schiller, Esq.; Heslin Rothenberg Farley & Mesiti P.C.

(57) ABSTRACT

Optimizations are provided for sibling calls. A sibling caller is marked to indicate that it may call a sibling routine or that it may call an external sibling routine. Based on the marking, certain processing is performed to facilitate use of sibling calls, particularly when the sibling routine being called is external to the caller.

20 Claims, 19 Drawing Sheets

(56) References Cited

U.S. PATENT DOCUMENTS

| | | | |
|---|---|---|---|
| 9,021,512 B1* | 4/2015 | Gschwind | G06F 8/70 719/331 |
| 9,146,715 B1* | 9/2015 | Gschwind | G06F 8/54 |
| 9,218,170 B1* | 12/2015 | Gschwind | G06F 8/43 |
| 9,250,875 B1 | 2/2016 | Gschwind et al. | |
| 9,250,881 B1* | 2/2016 | Gschwind | G06F 9/44521 |
| 9,274,932 B2 | 3/2016 | Crossley | |
| 2002/0099913 A1 | 7/2002 | Steely | |
| 2003/0056200 A1 | 3/2003 | Li | |
| 2006/0288173 A1 | 12/2006 | Shen | |
| 2008/0178158 A1* | 7/2008 | Hong | G06F 11/3419 717/128 |
| 2009/0187884 A1* | 7/2009 | Kryka | G06F 8/443 717/106 |
| 2010/0023703 A1 | 1/2010 | Christie et al. | |
| 2010/0125837 A1* | 5/2010 | Lobo | G06F 8/443 717/157 |
| 2011/0106724 A1 | 5/2011 | Day | |
| 2012/0304044 A1 | 11/2012 | Leithead et al. | |
| 2013/0263153 A1 | 10/2013 | Gschwind | |
| 2014/0129773 A1 | 5/2014 | Habermann | |
| 2015/0089139 A1 | 3/2015 | Zaks | |
| 2015/0095577 A1 | 4/2015 | Vijayrao | |
| 2015/0309812 A1* | 10/2015 | Gschwind | G06F 9/44521 717/140 |
| 2016/0117181 A1* | 4/2016 | Gschwind | G06F 9/44521 717/164 |
| 2016/0117201 A1* | 4/2016 | Gschwind | G06F 9/44521 719/328 |
| 2016/0226745 A1 | 8/2016 | Tran et al. | |
| 2016/0274878 A1* | 9/2016 | Tallam | G06F 8/443 |
| 2018/0165073 A1 | 6/2018 | Gschwind | |
| 2018/0165074 A1 | 6/2018 | Gschwind | |
| 2018/0165075 A1 | 6/2018 | Gschwind | |
| 2018/0165076 A1 | 6/2018 | Gschwind | |
| 2018/0165102 A1 | 6/2018 | Gschwind | |
| 2018/0165103 A1* | 6/2018 | Gschwind | G06F 9/44521 |
| 2018/0165104 A1 | 6/2018 | Gschwind | |

OTHER PUBLICATIONS

Mel, Peter and Tim Grance, "The NIST Definition of Cloud Computing," National Institute of Standards and Technology, Information Technology Laboratory, Special Publication 800-145, Sep. 2011, pp. 1-7.
IBM, "Power ISA™ Version 2.07B," International Business Machines Corporation, Apr. 9, 2015, pp. 1-1527.
IBM, "z/Architecture Principles of Operation," IBM® Publication No. SA22-7832-10, Eleventh Edition, Mar. 2015, pp. 1-1732.
Hock, Kuek Teck, "Through-the-Air Password Enabled Calls," IP.com No. 000004791, May 2001, pp. 1-3.
Bauer, Andreas et al., "Tackling C++ Tail Calls," Dr. Dobb's Journal, Feb. 2004, pp. 1-6.
Lin, Yun et al., "Clonepedia: Summarizing Code Clones by Common Syntactic Context for Software Maintenance," 2014 IEEE International Conference on Software Maintenance and Evolution, Sep. 2014, pp. 341-350.
Anonymous, "Application Binary Interface Modeling of Stack Layout and Function Call Sequence for Code Generation and Stack Management in Retargetable Compilers," IP.com No. 000214382, (no date information available), pp. 1-6.
Anonymous, "Automating Traversal of Function Call Graphs Contained in Program Execution Trace," IP.com No. 000198336, (no date information available), pp. 1-11 (+ cover).
Reppy, John, "Optimizing Nested Loops Using Local CPS Conversion," Jul. 2002, pp. 1-24.
Gschwind, Michael K., "Context Information Based on Type of Routine Being Called," U.S. Appl. No. 15/378,150, filed Dec. 14, 2016, pp. 1-65.
Gschwind, Michael K., "Suppressing Storing of Context Information," U.S. Appl. No. 15/378,161, filed Dec. 14, 2016, pp. 1-63.
Gschwind, Michael K., "Call Sequence Generation Based on Type of Routine," U.S. Appl. No. 15/378,189, filed Dec. 14, 2016, pp. 1-64.
Gschwind, Michael K., "Marking External Sibling Caller Routines," U.S. Appl. No. 15/378,211, filed Dec. 14, 2016, pp. 1-65.
Gschwind, Michael K., "Marking Sibling Caller Routines," U.S. Appl. No. 15/378,231, filed Dec. 14, 2016, pp. 1-65.
List of IBM Patents or Patent Applications Treated as Related, dated Dec. 19, 2016, pp. 1-2.
Gschwind, Michael K., "Context Information Based on Type of Routine Being Called," U.S. Appl. No. 15/799,133, filed Oct. 31, 2017, pp. 1-61.
Gschwind, Michael K., "Marking External Sibling Caller Routines," U.S. Appl. No. 15/810,849, filed Nov. 13, 2017, pp. 1-61.
List of IBM Patents or Patent Applications Treated as Related, dated Jan. 3, 2018, pp. 1-2.
International Search Report and Written Opinion for PCT/IP2017/057170 dated Jan. 26, 2018, pp. 1-10.
Bauer, Andreas, "Compilation of Functional Programming Languages Using GCC—Tail Calls," Jan. 2003, Munich University of Technology, pp. i-x & 1-123.
Herlihy, Maurice et al., "Transactional Memory: Architectural Support for Lock-Free Data Structures," Proceedings of the Annual International Symposium on Computer Architecture, May 1993, pp. 289-300.
Gschwind, Michael K., "Context Information Based on Type of Routine Being Called," U.S. Appl. No. 16/163,959, filed Oct. 18, 2018, pp. 1-64.
List of IBM Patents or Patent Applications Treated as Related, dated Oct. 18, 2018, pp. 1-2.

* cited by examiner

MARKING SIBLING CALLER ROUTINES

BACKGROUND

One or more aspects relate, in general, to processing within a computing environment, and in particular, to processing associated with sibling calls.

Sibling calls (also referred to as sibcalls) are calls to routines, such as functions or subroutines, performed at the end of a calling routine. When a caller makes a sibling call, the caller is not expecting the called routine to return to the caller. A calling routine and the called routine may be the same routine. When this occurs, the call may be referred to as a tailcall. The term, sibcall and derivations thereof, as used herein, include tailcalls and derivations thereof.

Detecting and implementing sibling calls offer an opportunity to improve code performance. However, today, in many environments, the effectiveness of sibcalls is limited by the restriction that sibcalls are to be made only to local callees. When a sibcaller (i.e., the function calling its sibling routine) has been called locally, the original call may not have generated enough information to perform a return from an external function. Since it is not known whether the sibcaller will be called using a local or extern call, the compiler may not generate sibcalls to any extern symbol.

SUMMARY

Shortcomings of the prior art are overcome and additional advantages are provided through the provision of a computer program product for facilitating processing within a computing environment. The computer program product comprises a storage medium readable by a processing circuit and storing instructions for execution by the processing circuit for performing a method. The method includes, for instance, determining whether a routine potentially calls one or more sibling routines; and marking the routine as a sibling caller, based on determining that the routine potentially calls one or more sibling routines. By marking the routine as a sibling caller, various optimizations may be performed, thereby improving performance within a computing environment.

In one embodiment, the marking includes adding a pseudo-instruction to the routine. The pseudo-instruction indicates to a linker executing on a processor of the computing environment that the routine potentially calls one or more sibling routines.

As one example, based on the pseudo-instruction, a marker is set in a symbol data structure indicating that the routine potentially calls one or more sibling routines.

As another example, based on the pseudo-instruction, a relocation entry associated with the routine is provided to indicate the routine potentially calls one or more sibling routines.

In another embodiment, the marking includes adding a marker to a symbol data structure of the routine, the marker to indicate that the routine potentially calls one or more sibling routines.

In yet another embodiment, the marking includes providing a relocation entry associated with the routine to indicate that the routine potentially calls one or more sibling routines.

In one aspect, the method further includes determining, by a linker executing on a processor of the computing environment, that the routine is marked as the sibling caller; and providing, based on determining the routine is marked as the sibling caller, context to be used based on a sibling routine called by the routine returning to a caller of the routine.

As an example, the context includes information to restore an indicator to a global offset table.

In embodiments, the routine is in one module and called by a calling routine in the one module, or the routine is in one module and called by a calling routine in another module.

As one example, the determining and the marking are performed by a compiler.

Methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

In accordance with one or more aspects of the present invention, a capability is provided to facilitate the use of sibling calls. For instance, optimizations are provided to efficiently use sibling calls and to enhance processing associated therewith.

Sibling calls provide efficiencies over other function calls. For example, take the following child routine:

```
child( )
{
    return sib(a+1);
{
```

Without using sibcalls, the following processing takes place, in one example:

```
child:
    (allocate stackframe)
    ld r3, r2, a@got
    addi r3, r3, 1
    bl sib
    NOP
    (deallocate stackframe)
    blr
```

Where ld is load, addi is add immediate, bl is branch link, NOP is no operation, and blr is branch to link register, e.g., in accordance with the Power architecture.

However, using sibcalls, the processing is, as follows, in one example:

```
child:
    (allocate stackframe)
    ld r3, r2, a@got
    addi r3, r3, 1
    b sib
    NOP
    (deallocate stackframe)
    blr
```

Thus, by using sibcalls, the child routine does not need to allocate or deallocate a stackframe used to save return information to be used by function child( ) to return to its caller after the subroutine call to function sib( ) has returned, or perform a NOP which serves as a placeholder for a potential global offset table (GOT) restore instruction, in case the linker resolves the call to sib( ) to correspond to a function that is external relative to the module of function child( ). The function child( ) transfers control to sib( ) using the branch instruction b and function sib( ) returns directly to the caller of child( ). Consequently, the code is simpler and more efficient.

Figure 1A:
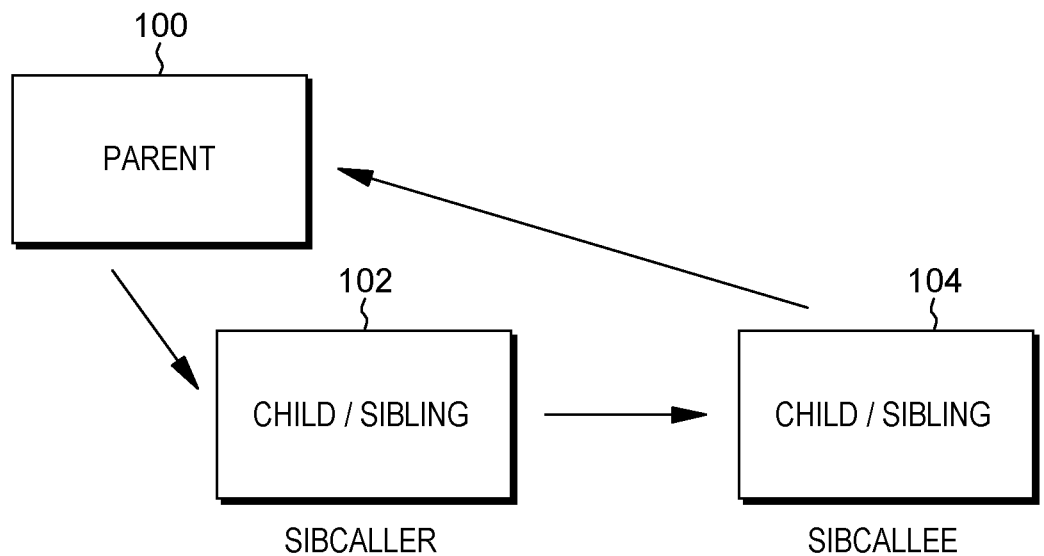
FIG. 1A depicts one example of a parent routine calling a child routine, which then calls a sibling routine, in accordance with an aspect of the present invention.

Further details regarding sibcalls are described with reference to FIGS. 1A-1B. As shown in FIG. 1A, a parent routine 100 calls a child routine 102. The child routine then calls a sibling routine 104. Child routine 102 is referred to as a sibcaller and sibling routine 104 is referred to as a sibcallee. Sibling routine 104 returns directly to parent routine 100, instead of returning to child routine 102, which would then return to parent routine 100.

Figure 1B:
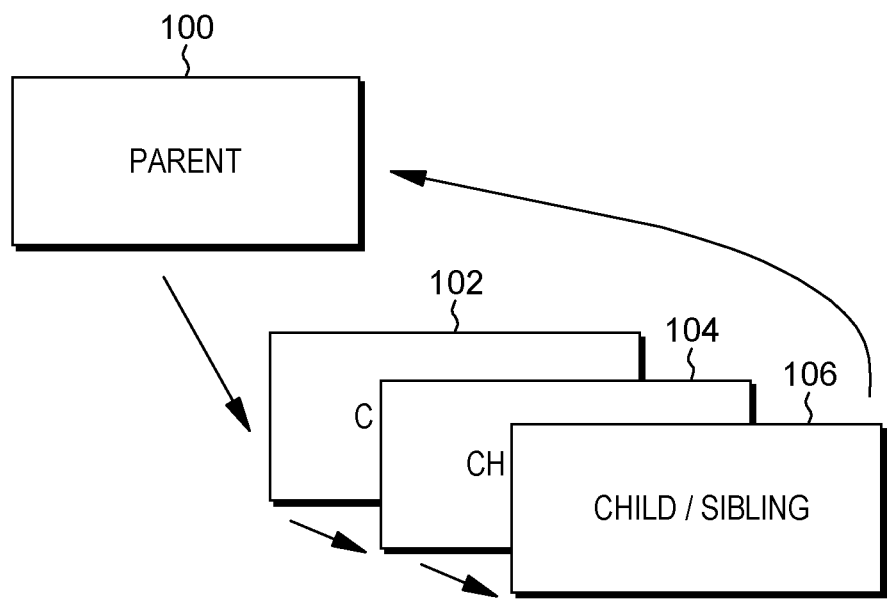
FIG. 1B depicts the use of a plurality of sibling routines, in accordance with an aspect of the present invention.

As shown in FIG. 1B, sibcallee 104 may further call a sibling routine 106, which then returns directly to parent routine 100. In this case, sibling routine 104 is also a sibcaller, and sibling routine 106 is a sibcallee.

In calling functions, an application binary interface (ABI) may be used, which determines how functions are called. An ABI may use a linker managed Global Offset Table (GOT), which provides access to variables. In particular, a compiler generates object code from source code, without knowing the final address or displacement of the code/data. Specifically, the compiler generates object code that will access a variable address reference data structure (e.g., a Global Offset Table or a Table of Contents (TOC)) for variable values without knowing the final size of the data structure or offsets/addresses of various data sections. Placeholders for this information are left in the object code and updated by a linker.

Figure 2A:
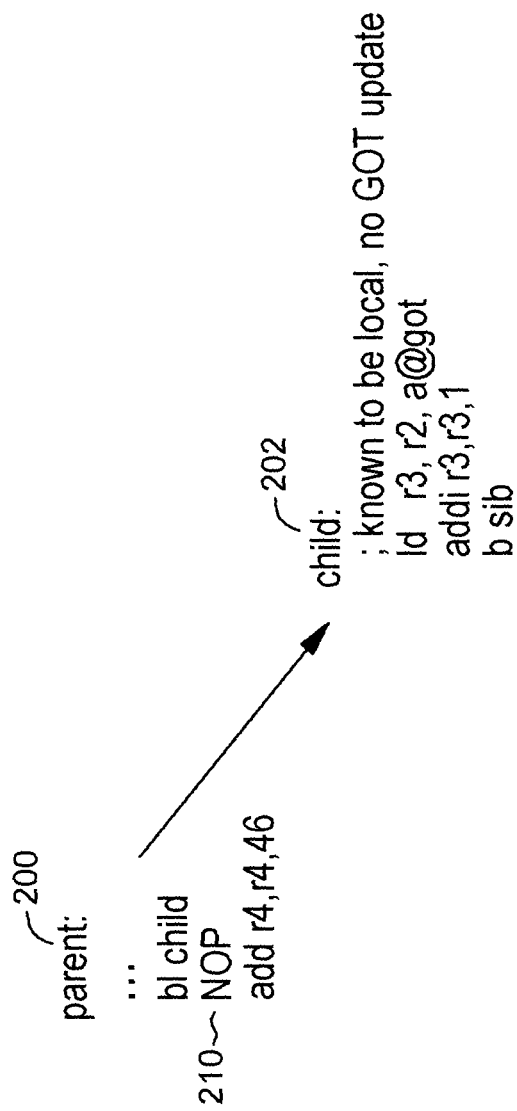
FIG. 2A depicts one embodiment of a parent routine calling a local child routine.

For an ABI with a linker managed GOT (or similar structure), sibcalls are currently restricted to compiler-determined local calls. An example of a local call is described with reference to FIG. 2A. A parent routine 200 calls a child routine 202 that is within a same module as the parent routine. The child routine is known to be local, and therefore, there is no GOT update; that is, there is no update to context information, including, for instance, return information, such as indicators to the GOT (e.g., GOT pointers) and/or other information. Since the child routine is local, on return to the parent routine, the context does not need to be updated, and therefore, parent routine 200 includes a NOP instruction 210, instead of an instruction to restore the context.

Figure 2B:
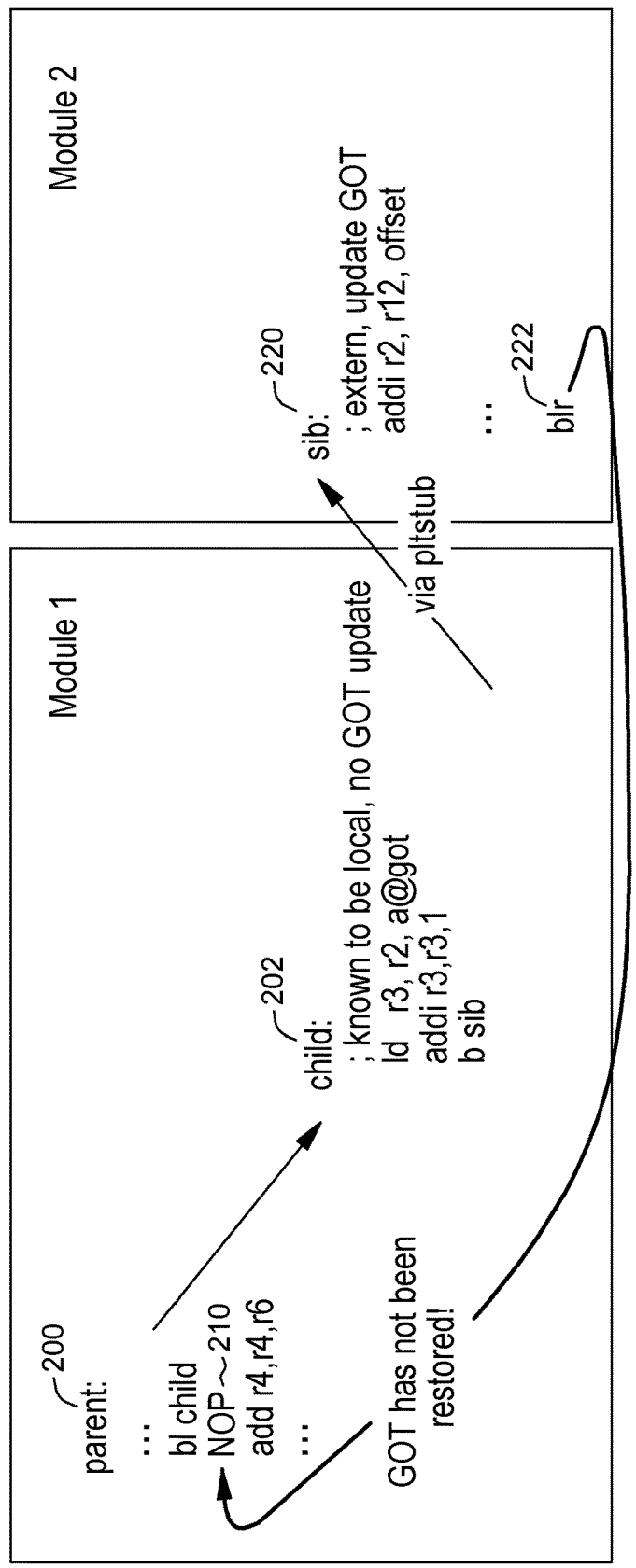
FIG. 2B depicts one embodiment of a local child routine calling an external sibling routine.

Since the context does not get restored, if the local child routine calls an external sibling routine, the context will be incorrect. For example, as shown in FIG. 2B, child routine 202 may call a sibling (sib) routine 220, which is in a different module than child routine 202 and parent routine 200, and therefore, is an external sibling routine. The linker connects child routine 202 to external sibling routine 220 by, for instance, a procedure link table (PLT) stub. The PLT stub provides a trampoline to external function 220. External function 220 executes and uses the GOT to reference its own global variables. It also updates the context information, e.g., the GOT. When it returns, using a branch to link register (blr) instruction 222, it returns to NOP 210 in the parent routine. However, the GOT has not been restored, as the call to function child( ) was generated as a module-local call and hence without the need to restore the GOT pointer (an example function context corresponding to a module in which execution occurs) so the next time the parent routine uses the GOT, it incorrectly uses the GOT for module 2 instead of module 1. Thus, sibcalls are currently restricted to compiler-determined local calls.

Figure 3A:
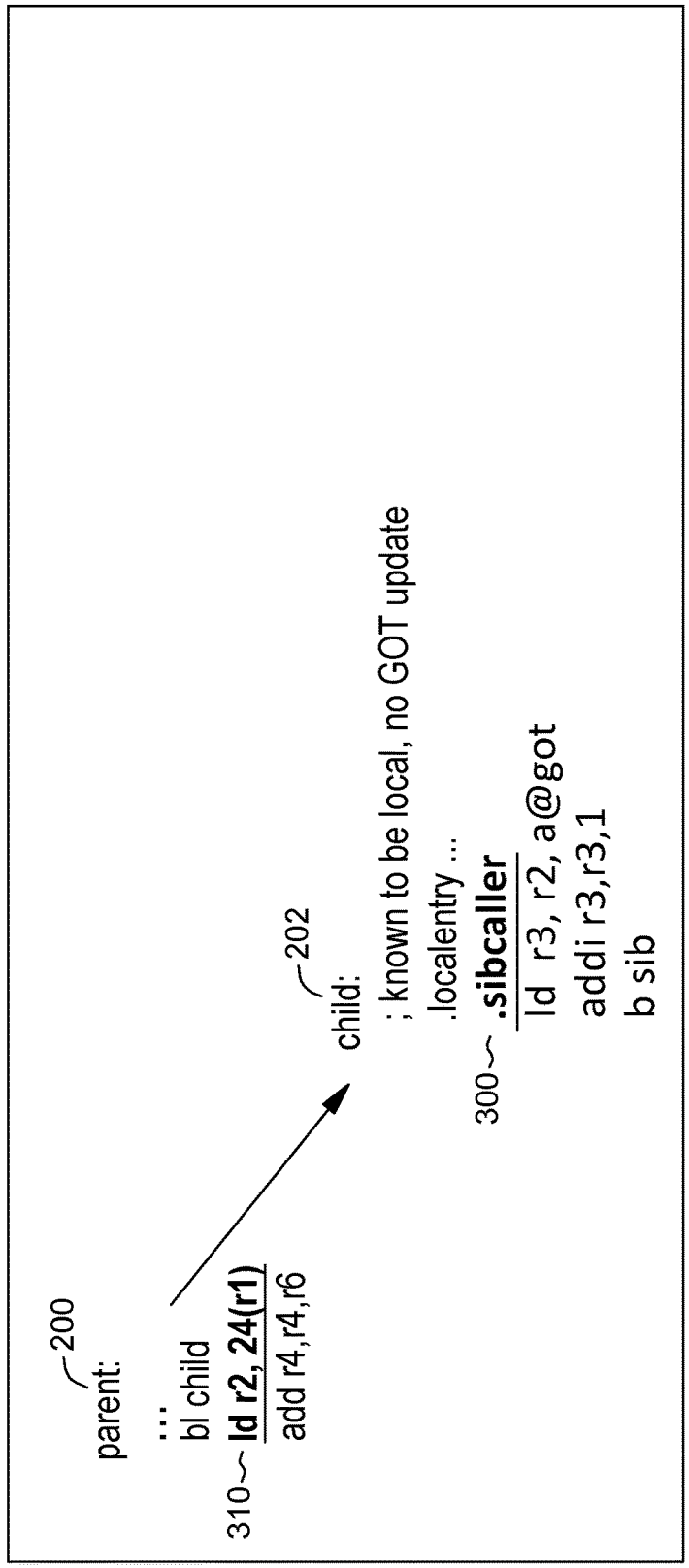
FIG. 3A depicts one embodiment of marking a child routine as a sibcaller, in accordance with an aspect of the present invention.

The problem arises since the call to the external function (or even a potential external function) is hidden from the linker. The linker sees a local call and omits restoration of the context information, such as the GOT pointer. Therefore, in accordance with an aspect of the present invention, a child routine, such as child function 202, is marked as a routine that potentially calls a sibling routine. In one embodiment, only sibcallers that may be calling external sibling routines are marked. This marking, as shown in FIG. 3A, may include, for instance, placing a pseudo-instruction (i.e., an instruction that is not executed by a processor, but provides an indication to the linker), referred to as sibcaller 300, in the child routine. Sibcaller pseudo-instruction 300 provides, for instance, an indication to the linker that the routine is or may be a sibcaller. For instance, based on pseudo-instruction 300, the assembler or other binary object translator marks, e.g., a symbol data structure (e.g., table) or provides a relocation (reloc) entry for the routine to indicate the routine is or may be a sibcaller.

As examples, different pseudo-instructions, markings and/or relocs may be used to distinguish between calling sibling routines and calling external sibling routines. Many variations are possible.

Figure 3B:
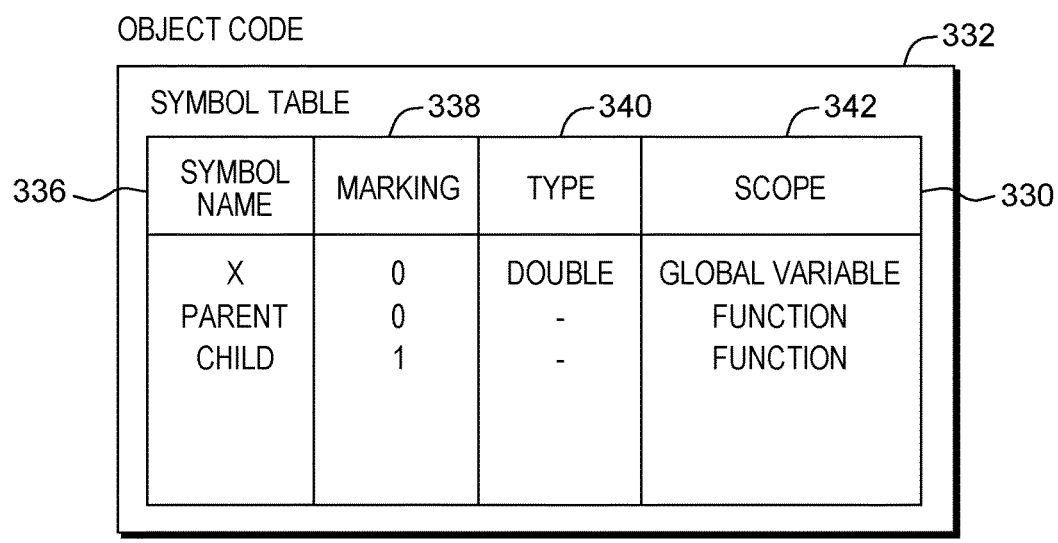
FIG. 3B depicts one example of a symbol table used in accordance with an aspect of the present invention.

In one particular example, as shown in FIG. 3B, a symbol table 330 is generated and stored in an application's object code 332 (e.g., stored in memory, on disk, etc.). A symbol table includes a number of fields, such as a symbol name 336, a type 340, a scope 342, and in accordance with an aspect of the present invention, a marking field 338 that indicates whether or not the function is a sibcaller. If the function is or potentially is a sibcaller, as indicated by pseudo-instruction 300, marking field 338 is set to, e.g., 1; otherwise it is set, e.g., to 0.

In a further example, based on pseudo-instruction 300, a relocation entry (e.g., .reloc) is created, in accordance with an application binary interface (ABI), and associated with the function to indicate the function is or potentially is a sibcaller. Relocation entries (.reloc) may be generated in accordance with the ELF (executable and linkable format), or a similar object file definition.

In further examples, an indication may be placed elsewhere, such as, e.g., in .localentry, a symbol table, or a .reloc relocation entry; or another marking of a function and/or its associated function symbol may be provided. As examples, the marking may be set in the symbol table or the relocation entry may be generated without use of the pseudo-instruction. Many variations are possible.

In accordance with one or more embodiments, marker indications that are in intermediate code, such as textual assembly language representation, may in turn be translated into a marker in a symbol table entry (e.g., using at least one bit of the st_other field or of another field of a symbol table entry as used in conjunction with the example ELF (executable and linkable format) format in accordance with the ELF ABI), a binary relocation indicator, or another object representation for marking either a function or its function symbol as corresponding to a sibcaller in an object file format. In yet another embodiment, the object file format may be directly generated by a code generation tool, such as a compiler.

In yet a further embodiment, a reloc entry may be added to a function to indicate it is a sibling. Generally, function calls are indicated with one of several function call relocations. Thus, a reloc may be used for sibling calls that is distinct from function calls. The presence of such a reloc could, in and of itself, be an indicator that a function calls a sibling routine. The function is scanned to determine whether any sibcalls are present. For a quicker determination, placing an indicator in the symbol table or a special "marker reloc" at the beginning of the function may be easier/faster to process than looking over the function to determine whether such a reloc is present.

When a marked sibcaller is linked by the linker, and the caller to the sibcaller is a local caller, the linker, based on the caller calling the sibcaller, generates a call sequence that stores sufficient context. For instance, the current value of a GOT pointer is stored, and context restoration code, such as GOT pointer restoration code is inserted, so that an external sibcall may be performed. For instance, returning to FIG. 3A, based on sibcaller pseudo-instruction 300, the linker obtains an indication (e.g., is notified, determines, etc.) that this function may call a non-local sibling routine, and therefore, the linker inserts, e.g., GOT pointer restore code 310, instead of NOP 210, even for local calls. In this example, r2 is the GOT register and ld refers to load.

Figure 3C:
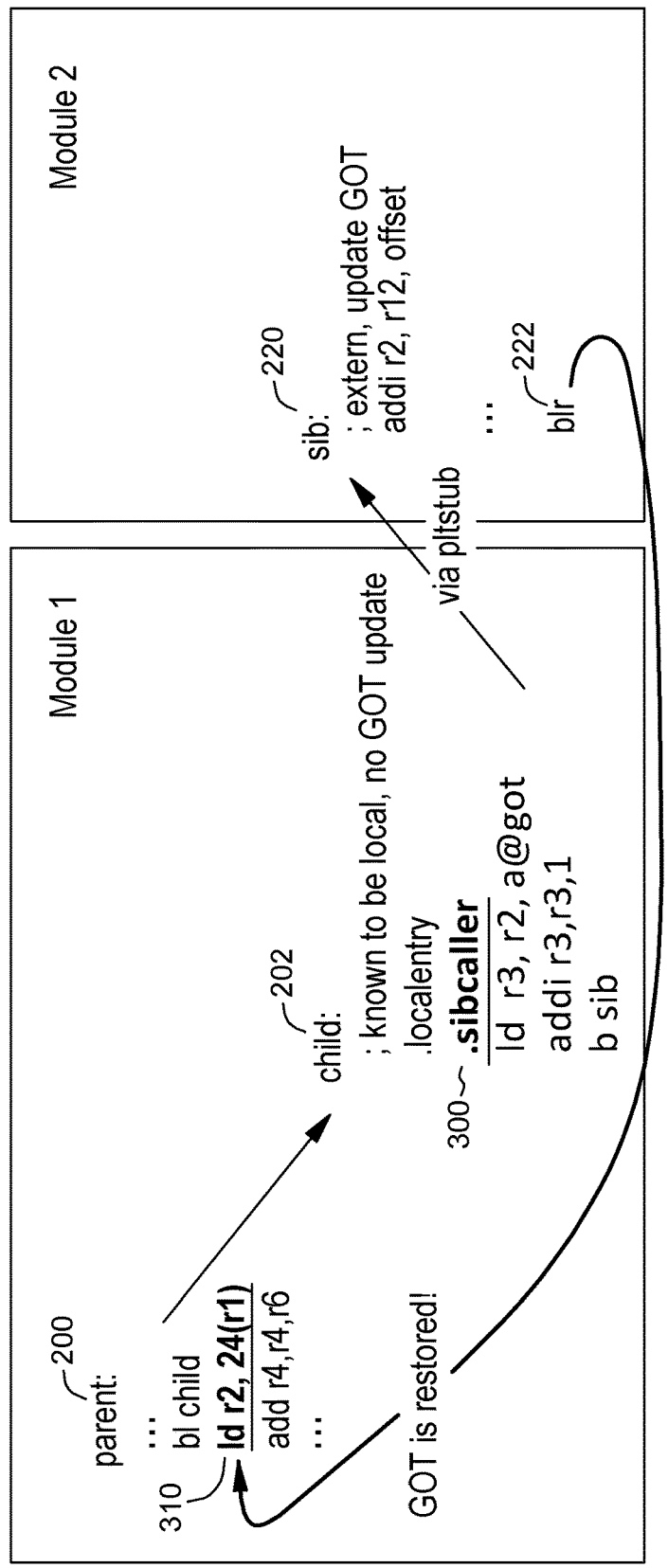
FIG. 3C depicts one example of context information being restored based on the child routine being marked as a sibcaller, in accordance with an aspect of the present invention.

Referring to FIG. 3C, based on the linker obtaining the indication and the linker providing the restoration code, when child routine 202 calls sib routine 220 and sib 220 returns via blr 222 to parent routine 200, the context information, e.g., GOT, is restored 310, so the next time parent routine 200 references the GOT, it references the correct GOT. For instance, in one embodiment, if child routine 202 is a potential sibcaller to an external sibling routine, the context (e.g., GOT pointer) is stored such that it may be restored on return from sib routine 220. As one example, the context may be stored in a stub, such as an abbreviated procedure link table (PLT) stub or other stub that stores the context information. In another embodiment, a placeholder instruction (e.g., a NOP instruction), placed in the parent routine (e.g., above the bl child instruction) to provide a placeholder for a GOT store instruction for external calls, is replaced with the GOT store instruction. Other examples may be used to store the context information.

The above technique may be used if the parent routine and the child routine are in the same module or different modules. That is, the child routine can be local to the parent routine or external from the parent routine, in which the child routine is accessed via, e.g., a PLT stub. It works in the external case (where a sibcaller indication for the called function may not be visible for the linker) because, regardless of the presence of sibcaller pseudo-instruction 300 in the sibcaller child function (which by definition is not available as it is external to the present module being linked), the static linker inserts the GOT save/restore restoration sequence since the child is external.

Figure 4A:
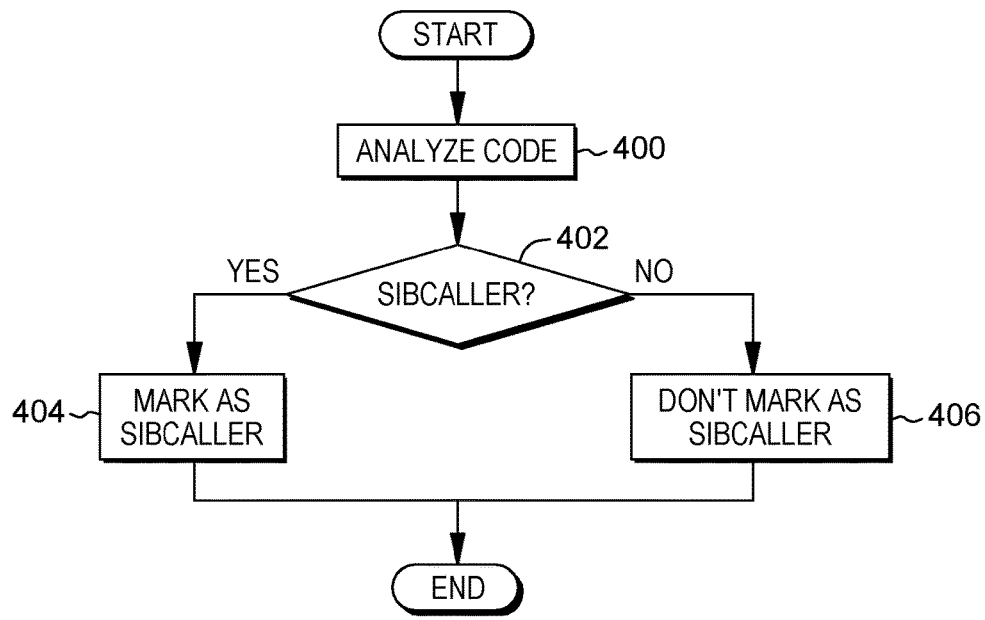
FIG. 4A depicts one embodiment of processing associated with a sibcaller, in accordance with an aspect of the present invention.
Figure 4B:
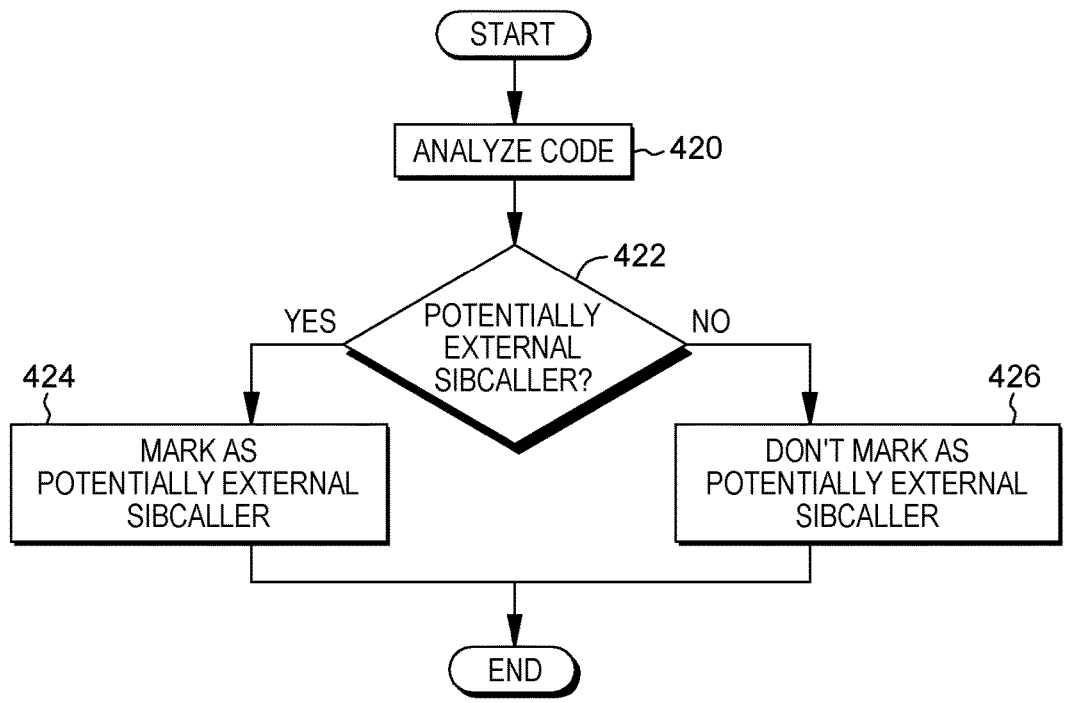
FIG. 4B depicts one embodiment of processing associated with a potentially external sibcaller, in accordance with an aspect of the present invention.

Further details regarding marking sibcallers are described with reference to FIGS. 4A-4B. Initially, referring to FIG. 4A, the compiler analyzes code looking for potential sibcallers, STEP 400. For instance, the compiler analyzes the code looking for function calls in which no further processing of the results of the called function is performed by the caller. If a routine is determined to be a potential sibcaller, INQUIRY 402, then the routine is marked as a sibcaller, STEP 404. For instance, the compiler inserts the sibcaller pseudo-instruction, marks a symbol table and/or adds a relocation entry. However, if a routine is not determined to be a sibcaller (or potential sibcaller), then such a marking is not performed, STEP 406.

In a further aspect, sibcallers that may be calling potential external siblings are determined and marked (e.g., instead of all sibcallers). For instance, as shown in FIG. 4B, code is analyzed by the compiler looking for potentially external sibcallers; i.e., sibcallers that may potentially call potential external sibcallees, STEP 420. In this case, the compiler analyzes the code looking function calls in which no further processing of the results of the called function is performed by the caller. Further, it determines whether the sibcall is known to be a local sibcall (e.g., based on programming constructs). If it is known to be a local sibcall, then it is not marked as a potential external sibcaller that may call a potential external sibling. However, if the call is not known to be a local sibcall, then the sibcaller is marked as potentially calling a potential external sibling.

In one embodiment, the compiler provides information about sibcallees in conjunction with sibcaller relocation information. In another embodiment, the linker analyzes the compiler generated code to determine the sibcallees. In one embodiment, additional hints are emitted by the compiler to aid the linker in analyzing a sibcaller function, e.g., by indicating the length or range of each function, or multiple ranges if a function has been compiled in a discontiguous manner.

If a sibcaller that may be calling an external sibling routine is determined, INQUIRY 422, then the sibcaller is marked as a potentially external sibcaller, STEP 424. In one embodiment, the compiler inserts the sibcaller pseudo-instruction (or another sibcaller pseudo-instruction that is specific for potentially external sibcallers), marks a symbol table and/or adds a relocation entry. In yet another embodiment, the linker analyzes the code for sibcall sites. However, if such a potentially external sibcaller has not been found, then such a marking is not performed, STEP 426.

Figure 5:
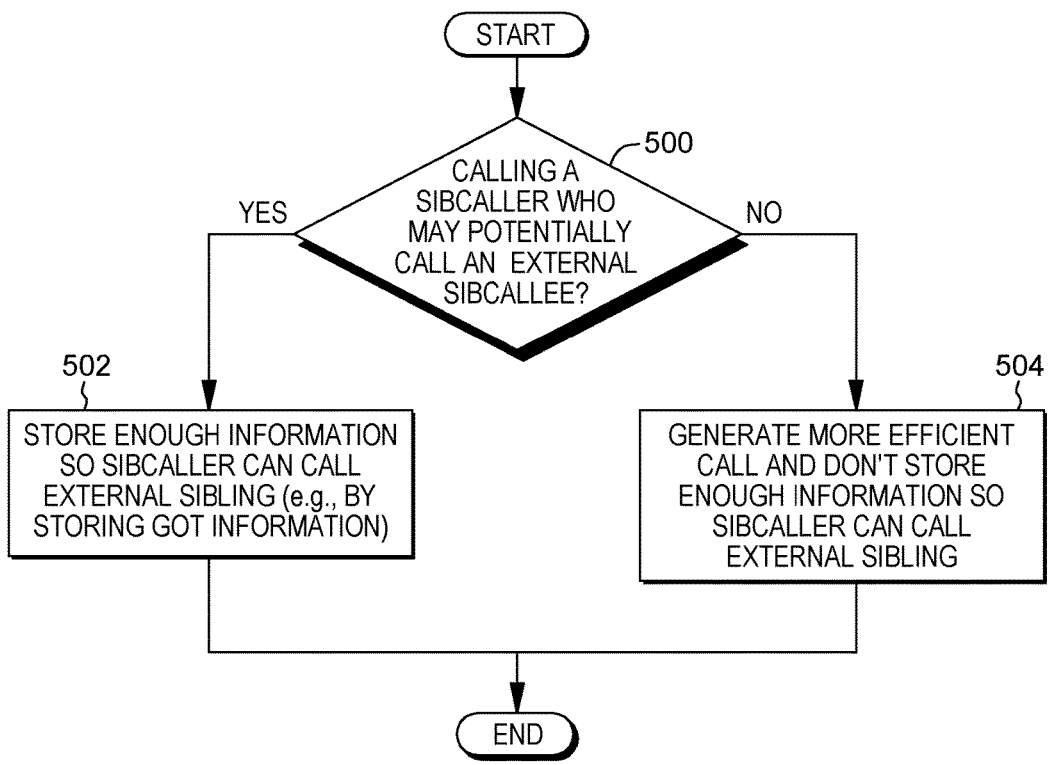
FIG. 5 depicts one embodiment of processing used to select information to be stored based on whether a sibcaller is being called, in accordance with an aspect of the present invention.

In a further aspect, with reference to FIG. 5, when a linker links a set of objects and determines that a local call may be performed, the linker performs a test to determine whether the called function corresponds to a sibcaller that may be calling an external sibling, INQUIRY 500. In one embodiment, this corresponds to determining whether the called function has been marked as a sibcaller, as described with reference to FIG. 4B. In another embodiment, the test is whether a sibcaller is being called without considering whether the sibcaller may be potentially calling an external sibcallee. In one example, this corresponds to determining whether the called function has been marked as a sibcaller, in accordance with, e.g., the technique of FIG. 4A. In yet another embodiment, this corresponds to determining whether the called function has been marked as a sibcaller in accordance with, e.g., the technique of FIG. 4A and further including a linker based analysis, e.g., based on one of the object code and associated relocations, or a list of sibcallers specified for a sibcaller in a file format, of whether any of the sibcallees may correspond to an external sibcallee.

If a sibcaller who may potentially call an external sibcallee (or, in another embodiment, a sibcaller regardless of whether calling an external sibcallee or a local sibcallee) is being called, the linker generates an external call sequence that stores and restores enough context information so that the sibcaller can call an external sibling routine (e.g., storing GOT or TOC information), STEP 502.

However, if a sibcaller who may potentially call an external sibcallee (or, in another embodiment, a sibcaller regardless of whether calling an external sibcallee or a local sibcallee) is not being called, then the linker generates an abbreviated call sequence, STEP 504. That is, a more efficient call is generated that does not store and restore enough context information so that the sibcaller can call an external sibling routine. Code is omitted for efficiency.

During execution, in one embodiment, the generated code performs a call to the sibcaller (which is so marked) and stores context information to be able to perform a return from an external module. The sibcaller is then called. The sibcaller performs an external sibcall to its external sibling, the sibcallee. An external function return is performed by the sibcallee using the global return information, stored by the caller to the sibcaller, when the sibcaller was called locally. Upon return from the sibcallee, the context information (such as a GOT pointer) is restored.

Figure 6:
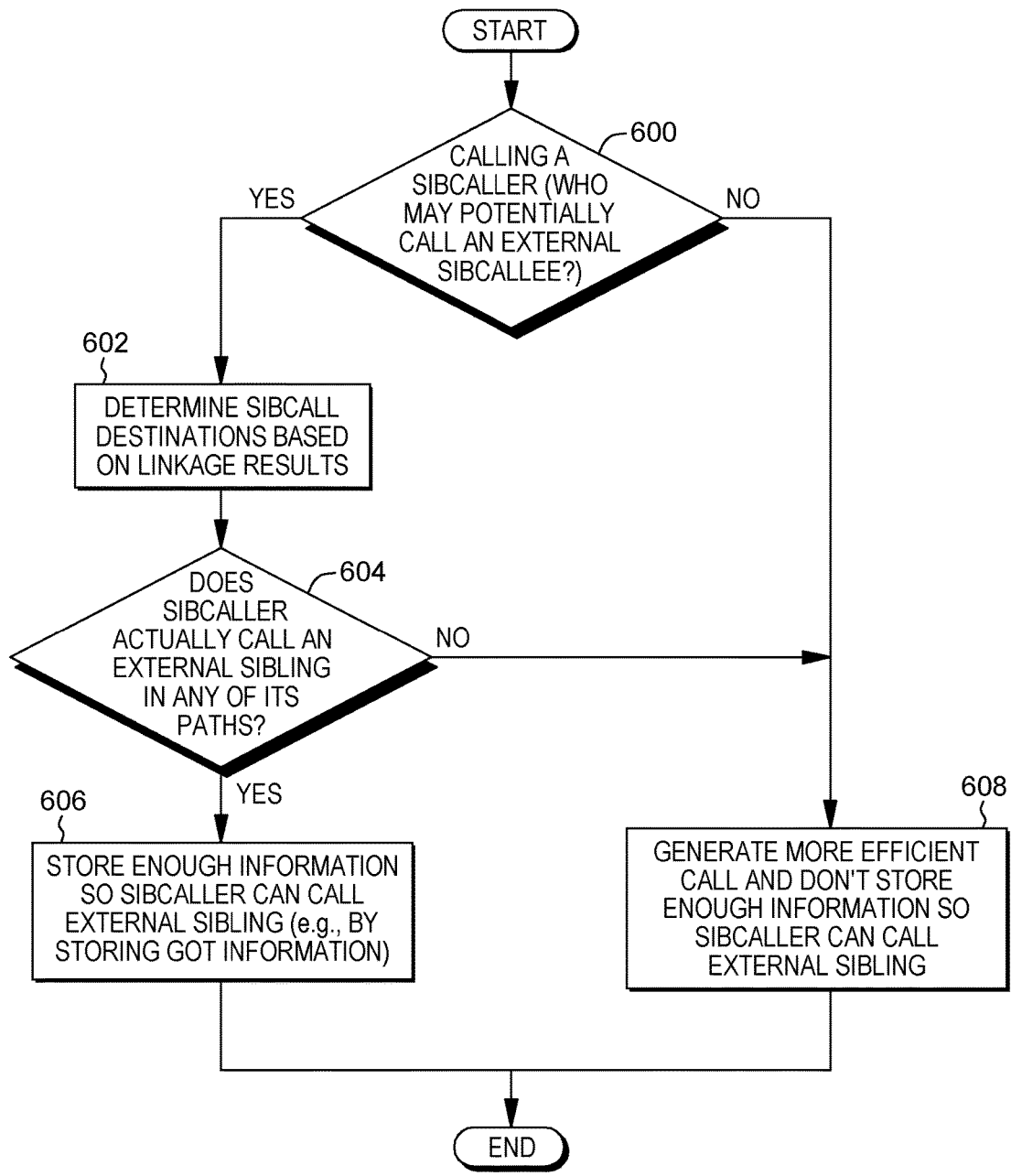
FIG. 6 depicts one embodiment of processing associated with calling a sibcaller, in accordance with an aspect of the present invention.

In a further aspect, a determination is made as to whether the sibcallees are actually external and action is taken based thereon. Referring to FIG. 6, in one embodiment, the linker determines whether a sibcaller who may potentially call an external sibcallee (or, in another embodiment, a sibcaller regardless of whether potentially calling an external sibcallee or a local sibcallee) is being called, INQUIRY 600. If a sibcaller who may potentially call an external sibcallee (or sibcaller regardless of whether potentially calling an external sibcallee or a local sibcallee) is being called, the linker determines sibcall destinations based on linkage results, STEP 602. A determination is made as to whether the sibcaller actually calls an external sibling in any of its paths, STEP 604. If an external sibling is called, then enough context information is stored so that the sibcaller can call an external sibling (e.g., GOT information), STEP 606. However, if the sibcaller does not call an external sibling, INQUIRY 604, or a sibcaller who may potentially call an external sibcallee (or a sibcaller regardless of whether potentially calling an external sibcallee or a local sibcallee) is not called, INQUIRY 600, then a more efficient call is generated, STEP 608. That is, information, such as the saving/restoring of the context information, is omitted.

In one embodiment, if any of the sibcallees of a first sibcaller is marked as a sibcaller, the sibcallee is treated as an external sibling. In another embodiment, if any of the sibcallees of a first sibcaller is marked as a sibcaller and the sibcall of the first sibcaller is not a tailcall (i.e., the sibcallee of the first sibcaller is not the first sibcaller calling itself), the sibcallee is treated as an external sibling.

As a further embodiment, the transitive closure of sibcallers is computed with respect to external module calls (i.e., to determine whether any of the sibcallees that are called by the sibcaller are calling external siblings, or in turn are calling sibcallers that may be calling external siblings, and so forth), and if any extern sibcall is found in the transitive closure of the called siblings, then the sibcaller is called with a call saving enough information to return from such an eventual external sibling.

In one embodiment, optimization analysis, configuration files, programmer hints, or profile directed feedback may indicate to perform one or more of the sibcaller optimizations for some functions, but not others. For example, when the sibcaller rarely calls the sibling routine, the optimization may not be advantageous and one of a programmer, feedback component or analysis component may determine to suppress the optimization for a particular sibcaller. In one example, this adaptive step suppresses the call sites of a sibcaller and performs normal function calls rather than sibcalls and causes the sibcaller not to be marked. Other examples are also possible.

In another embodiment, optimization analysis, configuration files, programmer hints, or profile directed feedback may indicate to perform one or more sibcaller optimizations for some called sibling routines of a sibcaller, but not others. For example, if one sibcaller is commonly called and local, and another is rarely called and external, when the sibcaller rarely calls the sibling routine, the optimization may not be advantageous in that call site and one of a programmer, feedback component or analysis component, may determine to suppress the optimization for a particular sibcaller. In one example, this adaptive step suppresses possibly one call site to a sibling routine of a sibcaller, and excludes that symbol from the list of sibcallees that are to be considered when deciding to store context information to enable an extern return.

Figure 7A:
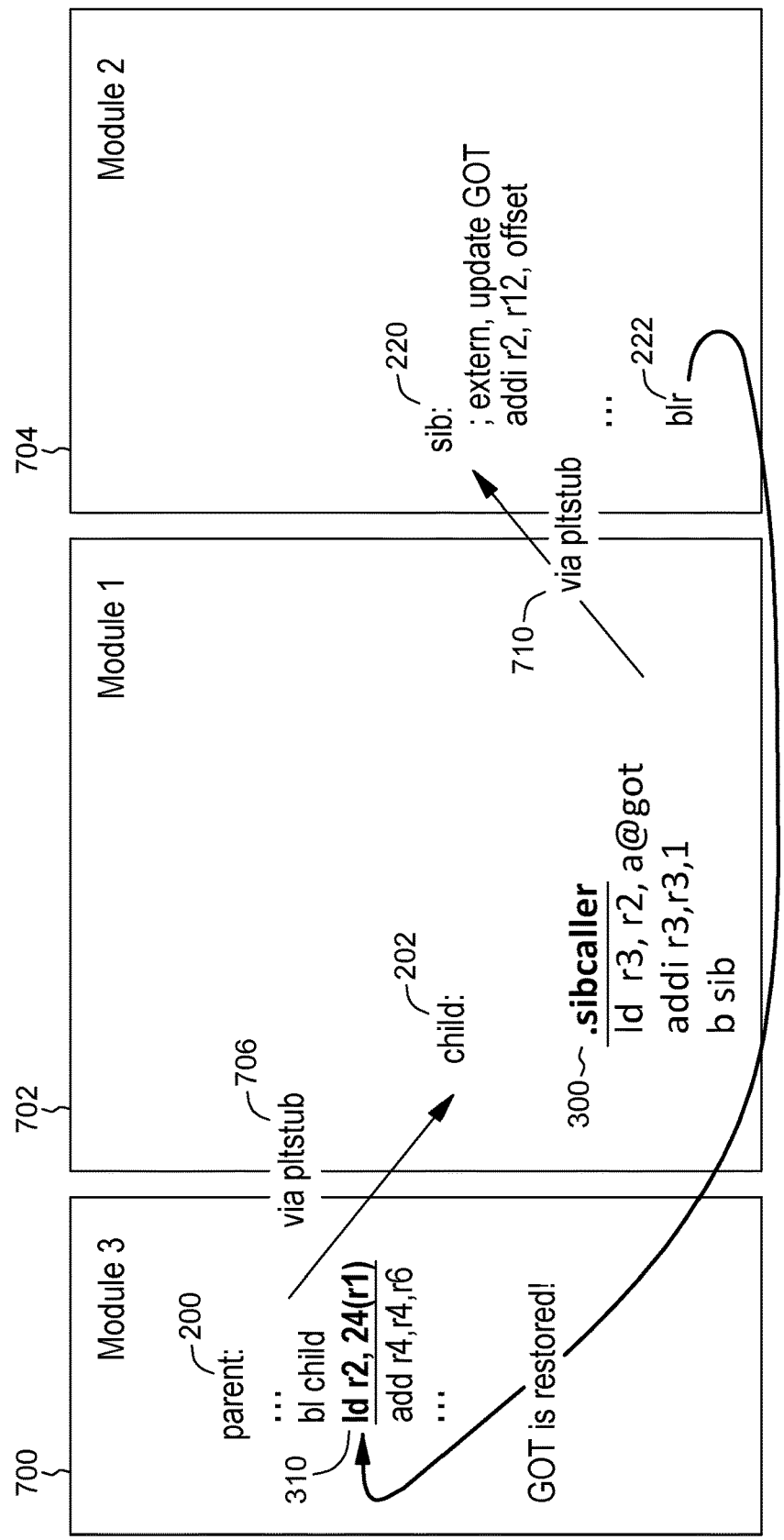
FIG. 7A depicts one example of an external child routine calling an external sibling routine, in accordance with an aspect of the present invention.

A further aspect of the present invention addresses the situation in which the child routine is external to its parent routine. In one example, a child routine that is external to its parent routine is not to call an external sibling, since such a call may corrupt the context information (e.g., GOT pointer). For instance, referring to FIG. 7A, if parent routine 200 is in one module 700 (e.g., module 3) and calls child routine 202 in another module 702 (e.g., module 1) via, e.g., a PLT stub 706 (or function call), then PLT stub 706 stores context information corresponding to module 3 (e.g., the GOT pointer). Then, if child routine 202 calls sibling routine 220 in yet another module 704 (e.g., module 2) via, e.g., a PLT stub 710 (or function call), then PLT stub 710 stores other context information that overwrites the first context information corresponding to module 3. However, on return (e.g., blr 222) from sibling routine 220 in module 2 to parent routine 200 in module 3, it is the first context information corresponding to module 3 that is desired.

In one embodiment of a PLT stub, the following code sequence is used to transfer control from module 1 to module 2 while storing the GOT pointer corresponding to module 2 using a standard store double instruction:

```
std r2, 24(r1)
addis r12, r2, func@plt@toc@ha
ld r12, func@plt@toc@l(r12)
mtctr r12
bctr
``` where std is store double, addis is add immediate, toc is table of contents, ld is load, mtctr is move to count register, and bctr is branch counter register.

In another embodiment, the std instruction is placed in a placeholder location previously allocated by the compiler, and the PLT stub performs only the control transfer:

```
addis r12,r2,func@plt@toc@ha
ld r12,func@plt@toc@l(r12)
mtctr r12
bctr
```

However, in accordance with an aspect of the present invention, the saving of the second context information is suppressed. For instance, the linker or the compiler creates a PLT stub without saving the context information for sibcalls (e.g., without the GOT pointer save; e.g., without the std instruction). As an example, a relocation may be used to indicate the presence of a sibcall, as the particular call by the sibcaller, rather than a normal call, thereby suppressing the std to be placed in the PLT stub, or in a scheduled placeholder. Thus, a PLT stub for a sibcall may correspond to the following sequence without a std instruction as part of the PLT sub nor placed into a placeholder created by a compiler to receive such a GOT store instruction:

```
addis r12,r2,sib@plt@toc@ha
ld r12,sib@plt@toc@l(r12)
mtctr r12
bctr
```

In another embodiment, when the code is generated, to avoid creating new relocation commands (relocs) that require a linker to be updated to understand the newly defined sibcall relocs, the compiler generates, e.g., a TOC-SAVE reloc that points to a dummy location in conjunction with a sibcall, and the linker fills in an unused location that is not executed, effectively suppressing the GOT save.

Figure 7B:
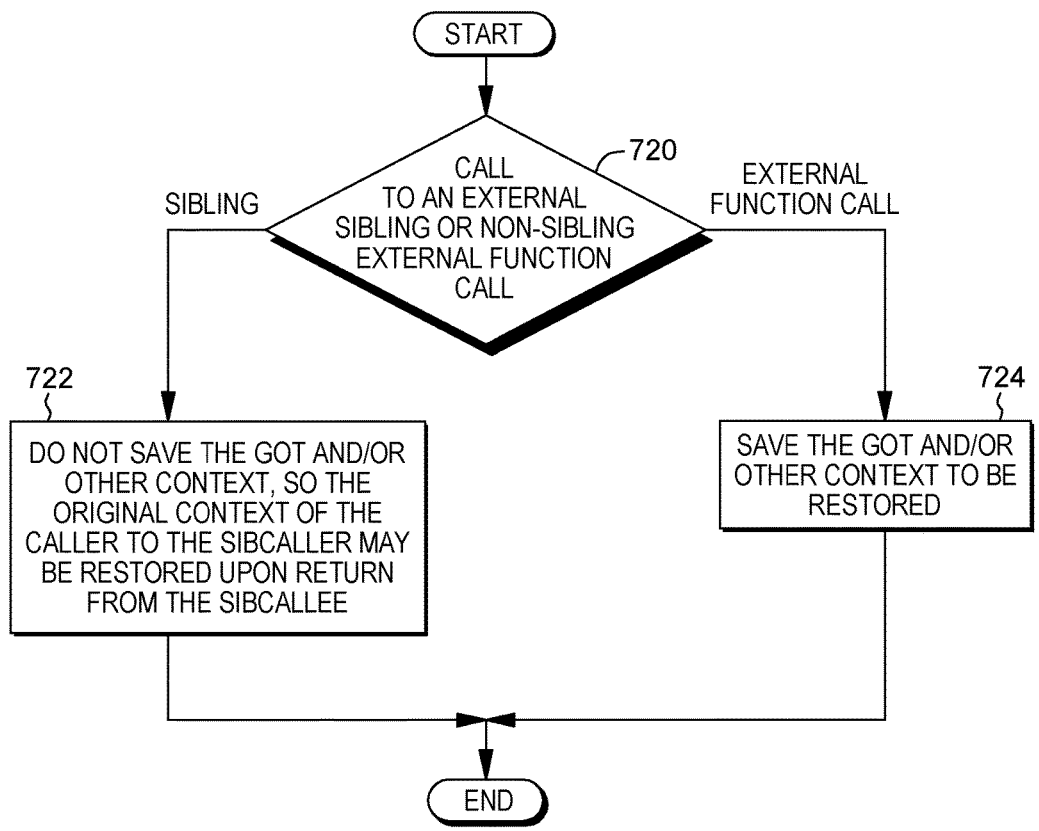
FIG. 7B depicts one embodiment of processing associated with calling an external sibling routine, in accordance with an aspect of the present invention.

Further details relating to processing associated with external sibling routines are described with reference to FIG. 7B. Initially, a determination is made (e.g., by the linker or the compiler) as to whether a child routine (or other sibling routine) is calling an external sibling routine, as opposed to a non-sibling external function call, INQUIRY 720. An external sibcall may be recognized by, for example: use of a new relocation command for sibcalls that indicates it is a sibcall and not a non-sibling function call or by determining there is a branch without a return to an external symbol. If an external sibling routine is being called using a sibcall, in accordance with an aspect of the present invention, the context information, including an indicator to the GOT (e.g., the GOT pointer), is not saved (this is referred to herein as not saving the GOT), such that the original context of the caller to the sibcaller may be restored upon return from the sibcallee, STEP 722. However, if an external function call (and not a sibcall) is being performed, then the context information, including an indicator to the GOT (e.g., the GOT pointer), is saved (this is referred to herein as saving the GOT), such that it can be restored later, STEP 724.

Figure 8:
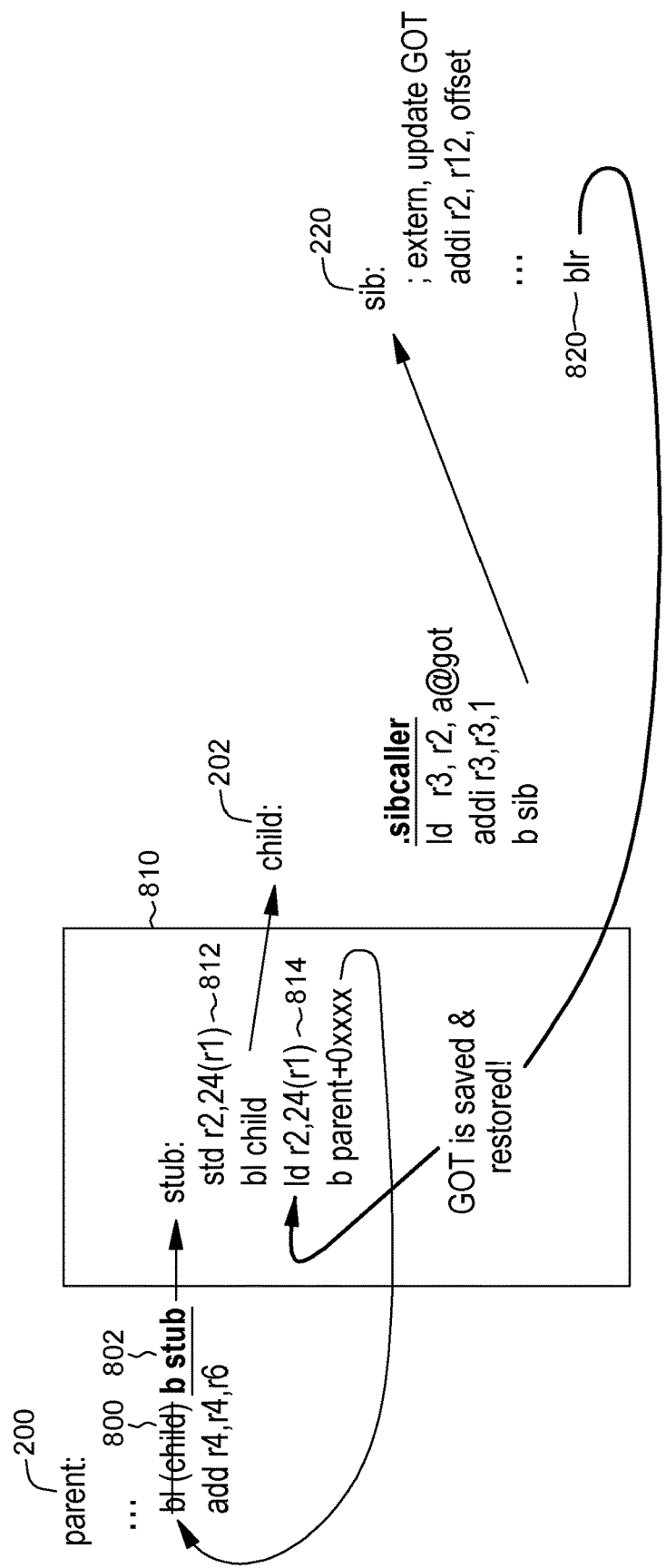
FIG. 8 depicts one embodiment of providing a correction for a situation in which the parent routine thought it was calling a local child routine but instead was calling an external child routine or the local child routine called an external sibling routine, in accordance with an aspect of the present invention.

In addition to the above, in code, a call may be defined as a local call, and as such, the compiler may have suppressed the NOP instruction as the placeholder for the GOT restore instruction from an external call. However, if it is indicated that the child calls an external sibling, then in accordance with prior techniques, the context cannot be restored because no location to receive the context restore instruction is provided with a placeholder NOP instruction. Thus, in accordance with an aspect of the present invention, rather than directly branching to a child sibcaller which may be calling an external sibling routine, the subroutine branch can be edited from a branch link to the child routine to a branch to a stub function, which includes the branch link to the child routine, as well as store and restore instructions of the context information (e.g., GOT information). In particular, as shown in FIG. 8, parent routine 200 calls child routine 202, which is known to be a local routine. Therefore, parent routine 200 does not include a NOP instruction. However, child routine 202 calls an external sibling 220. Thus, in accordance with an aspect of the present invention, the branch link (bl) statement 800 is replaced with a branch to stub instruction 802, which branches to stub 810. In that stub, the context information is saved 812 and later restored 814 upon a return 820 from sibling routine 220.

Described in detail herein are a number of optimizations that may be performed to efficiently process sibling calls. One or more aspects of the present invention are inextricably tied to computer technology and facilitate processing within a computer, improving overall performance.

One particular embodiment of facilitating processing in a computing environment is described with reference to FIGS.

9A-9B. This embodiment includes marking sibling caller routines in order to optimize processing associated therewith.

Figure 9A:
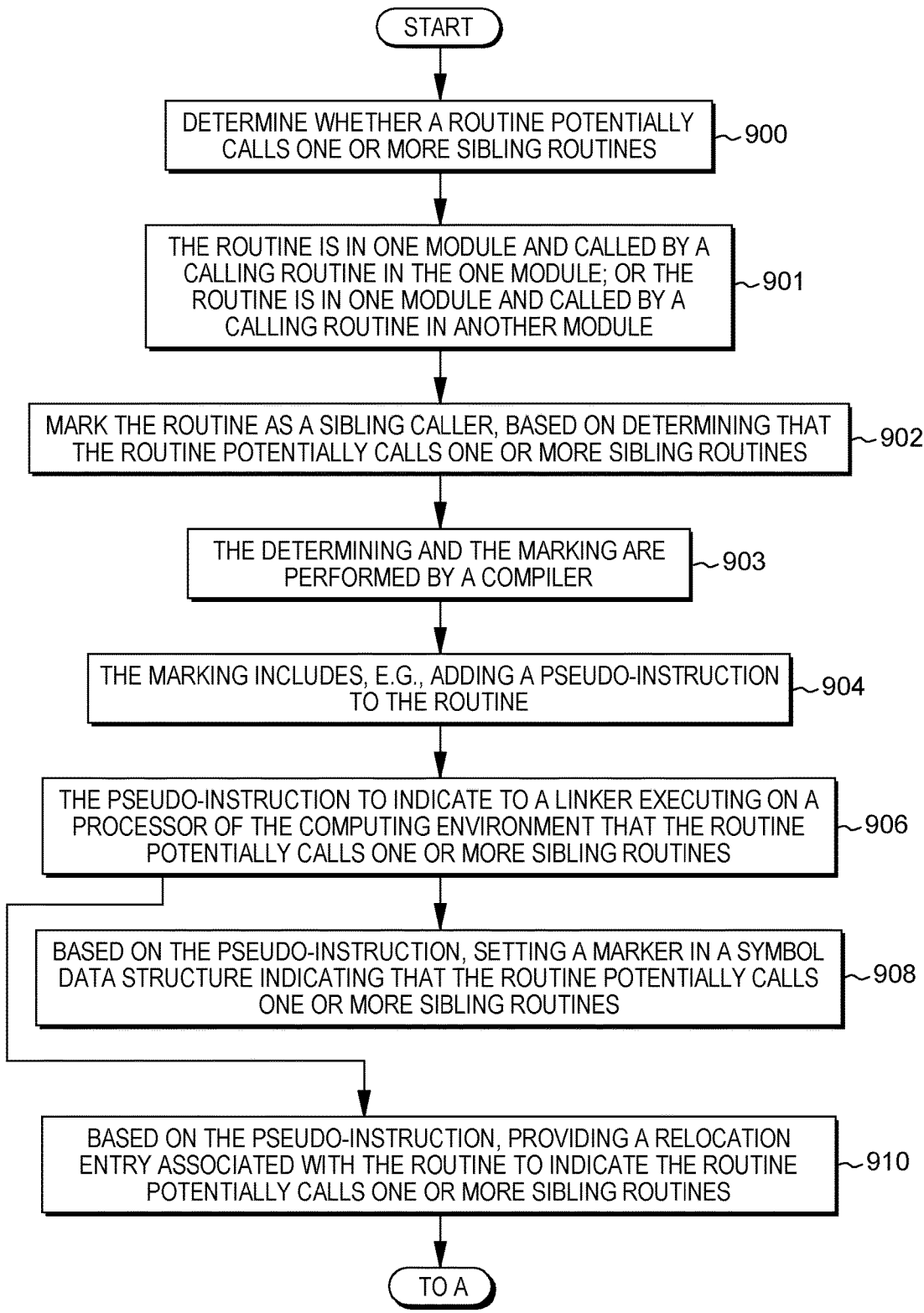
FIGS. 9A-9B depict one embodiment of facilitating processing in a computing environment, in accordance with an aspect of the present invention.

Referring, initially to FIG. 9A, a determination is made as to whether a routine potentially calls one or more sibling routines (900). As examples, the routine is in one module and called by a calling routine in the one module, or the routine is in one module and called by a calling routine in another module (901). Based on determining that the routine potentially calls one or more sibling routines, the routine is marked as a sibling caller (902). In one example, the determining and the marking are performed by a compiler (903). Other embodiments and examples are possible and are considered within the scope of the claimed invention.

In one embodiment, the marking includes adding a pseudo-instruction to the routine (904). The pseudo-instruction indicates to a linker executing on a processor of the computing environment that the routine potentially calls one or more sibling routines (906). Based on the pseudo-instruction, in one example, a marker is set in a symbol data structure indicating that the routine potentially calls one or more sibling routines (908). In another example, based on the pseudo-instruction, a relocation entry associated with the routine is provided to indicate the routine potentially calls one or more sibling routines (910).

Figure 9B:
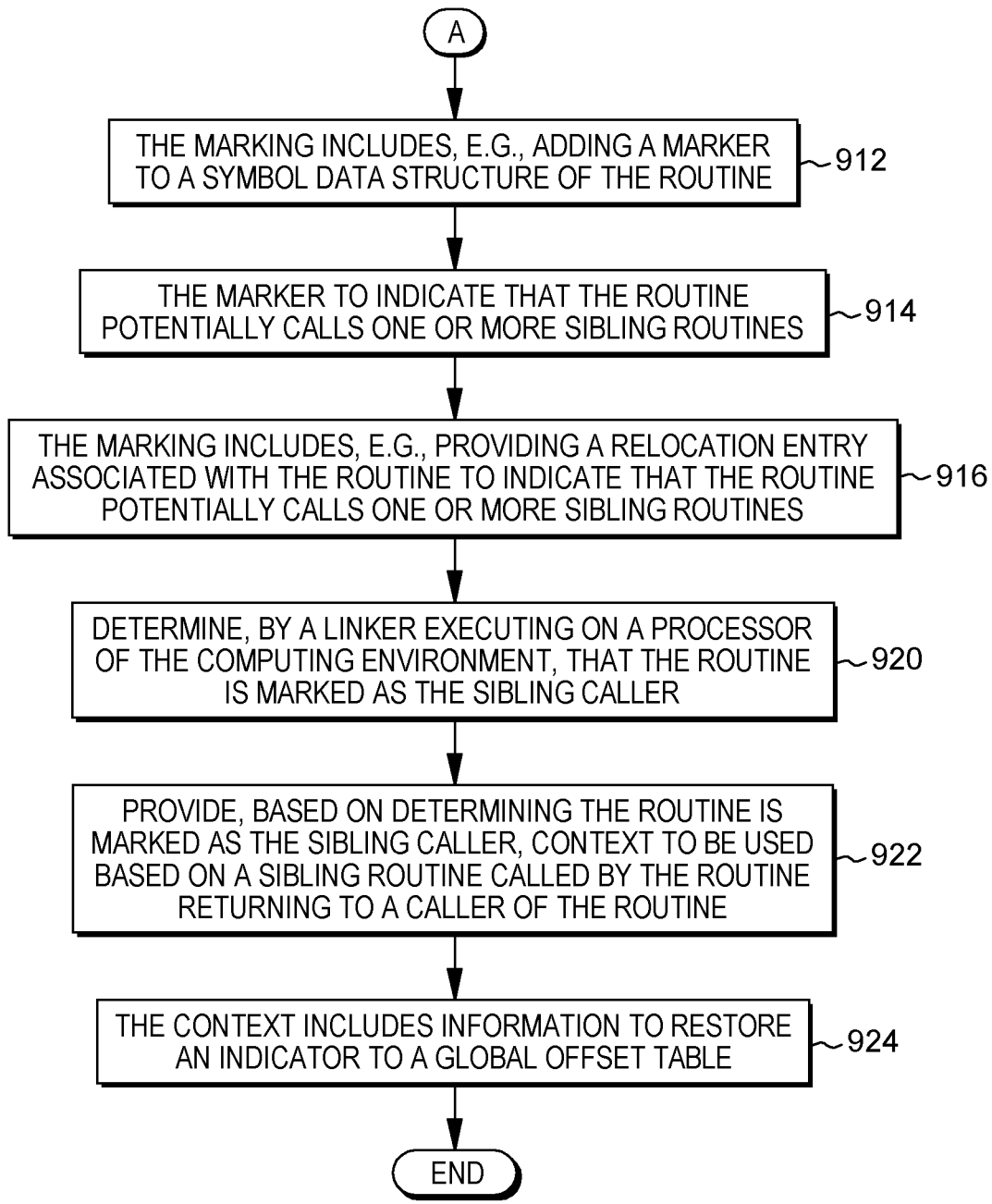

Referring to FIG. 9B, in another embodiment (e.g., in which the pseudo-instruction may not be used), the marking includes adding a marker to a symbol data structure of the routine (912). The marker (e.g., set to one) indicates that the routine potentially calls one or more sibling routines (914). In yet a further embodiment (e.g., in which the pseudo-instruction may not be used), the marking includes providing a relocation entry associated with the routine to indicate that the routine potentially calls one or more sibling routines (916).

In a further aspect, the linker executing on a processor of the computing environment, determines that the routine is marked as the sibling caller (920), and provides, based on determining the routine is marked as the sibling caller, context to be used based on a sibling routine called by the routine returning to a caller of the routine (922). In one example, the context includes information to restore a global offset table (924).

As described herein, in accordance with one or more aspects of the present invention, a sibcaller is marked by, e.g., the compiler. In one embodiment, sibcallers that may be calling external sibling routines (e.g., sibling routines in different modules) are marked, and sibcallers that may be calling local sibling routines (e.g., within the same module as the sibcaller) are not marked.

In one embodiment, when a marked sibcaller is linked by the linker, and the caller to the sibcaller is a local caller (e.g., the caller and the sibcaller are in the same module), the linker generates a call sequence that stores sufficient information so that an extern sibcall may be performed by the sibcaller. In a further embodiment, when a marked sibcaller is linked by the linker, the caller to the sibcaller is a local caller, and the sibcaller is marked as an external sibcaller, the linker generates a call sequence that stores sufficient information so that the extern sibcall may be performed.

In one embodiment, a sibcaller is identified (e.g., as a function that is being called which might call a sibling routine using a sibcall sequence), so that, e.g., a linker can insert code to save the full context (e.g., code to store/restore a GOT pointer), in case the sibcaller may want to transfer to an external sibling. The compiler performs the marking, and in one embodiment, only the sibcallers that may potentially call external sibling routines are marked by the compiler. By not marking the sibcallers that do not call external sibling routines, but instead, call local sibling routines, extra overhead is avoided.

As an example, the marking is performed with an indicator. For instance, the indicator is a relocation type in accordance with an application binary interface, such as an ELF ABI. As another example, the indicator is a flag in a symbol table entry for this function. In one example, the indicator is set (e.g., by the assembler or other binary object translator), based on a pseudo-instruction placed in the sibcaller by the compiler. The pseudo-instruction is placed in either all sibcallers or sibcallers determined to potentially call external sibling routines, based on the selected embodiment. The compiler emits the file having the indicator and the linker reads the file, as one example.

In one embodiment, the linker reads the indicator for a function, and based on the indicator being set (e.g., to one) indicating the sibcaller potentially calls sibling routines or external sibling routines, dependent on the embodiment, saves the full context (e.g., store/restore code for a GOT pointer) based on calling a sibcaller that may be calling external sibling routines. If, however, the sibcaller is calling local sibling routines, the saving of the context is suppressed at the call site to the sibcaller, based on determining that the sibcaller calls only local sibcallers using sibcalls.

As indicated, a sibcaller is marked by, e.g., the compiler. In one particular embodiment, sibcallers that may be calling external sibling routines are so marked. In one example, the compiler provides information about the potential sibcallees, e.g., by providing a list of sibcallees in conjunction with the sibcaller relocation. In another example, the linker analyzes the compiler generated code to determine the sibcallees. In one embodiment, additional hints are emitted by the compiler to aid the linker in analyzing a sibcaller routine (e.g., by indicating the length or range of each routine, or multiple ranges, if a routine has been compiled in a discontiguous manner.)

In one embodiment, when a marked sibcaller is linked by the linker, and the caller to the sibcaller is a local caller, and the sibcaller is marked as a potentially external sibcaller, the linker performs an analysis-step to determine whether any of the called siblings are in fact external sibling routines. If no external sibling routine is present (e.g., the sibling routines have been resolved locally, e.g., by a static linker), then a local call to the sibcaller is performed. If at least one of the sibling routines called by the sibcaller is external, enough information to perform an external routine return is stored prior to calling the local sibcaller. In one embodiment, the linker generates a call sequence that stores sufficient information so that an extern sibcall may be performed.

In one embodiment, the compiler creates a list of routines that may be called as sibling routines for a sibcaller, and provides that list in an object file. As examples, the list is associated with a function that is a sibcaller, or as a relocation (or a sequence of relocations) at the beginning of the routine. The linker uses this information, as follows: if all the sibcallees are local, then the sibcaller, when called as a function, can be called with a sequence saving "local call" context (e.g., no store/restore of the GOT pointer); otherwise, the call is saved with full context (e.g., with store/restore of the GOT pointer), since it may hand off control to an external routine which is to return and restore context for the external routine.

In another embodiment, an indicator may be provided that associates a list of routines as possibly called as sibling routines by a routine, indicated as being a sibcaller. The list is associated with a routine that is a sibcaller, or as a relocation (or sequence of relocations) at the beginning of the routine.

In yet a further embodiment, the compiler may mark each call to a sibling routine as a sibcall. In yet a further embodiment, the compiler marks instructions that are part of the sibcaller.

As indicated, in one example, an indicator is provided to mark a sibcall as a sibcall, rather than a typical function call (e.g., using relocation or flag in the symbol table). In a further embodiment, a marker is provided to mark a range of a routine (e.g., which instructions belong to what routine). In one aspect, the linker reads the markers for sibcalls being made, and the markers indicate which instructions belong to what routines in order to determine the sibcalls corresponding to a particular routine. The linker, as an example, builds a list of sibcallees for a potential external sibcaller, and based on that list makes a determination as to whether any of them are external. If the sibcallees are local, then this sibcaller, when called, can be called with a sequence saving the local call context; otherwise, the call is saved with the full (external call) context, as described above.

In one embodiment, when an external sibcall is to be made, the context information is not to be stored since the storing of that context information will overwrite context information previously stored (e.g., when the external sibcaller was called by a caller that is external to the sibcaller). Thus, in accordance with one or more aspects, the saving of the context information is suppressed. In one embodiment, this is performed by creating a PLT stub (either by the compiler or the linker) that does not include the storing/restoring of the context information (e.g., the GOT pointer).

An external sibcaller (i.e., a sibcaller that is or potentially calls an external sibling routine) is recognized, for instance, by a relocation specifically defined for sibcalls, by diagnosing a branch with no return to an extern symbol, or by another means. In one embodiment, if the compiler generates code that is not understood by the linker, the compiler suppresses generation of the context information to be conservative.

In one embodiment, the compiler inserts the specifically defined relocation that points to a dummy location, in conjunction with a sibcall, and then, the linker fills in the location with an address that is not executed, effectively suppressing the context save.

In another embodiment, for register indirect sibcalls, the compiler emits a call sequence without the context save.

Aspects of the present invention provide linker/compiler managed context saving in conjunction with external sibcallers. In one embodiment, a program is provided that is adapted to generate an application performing external sibcalls when the program uses a compiler and linker managed GOT.

Although a number of embodiments and examples are provided above to optimize the use of sibcalls, thereby facilitating processing in a computing environment and improving performance, other embodiments and examples are also possible and considered aspects of the invention.

Figure 10:
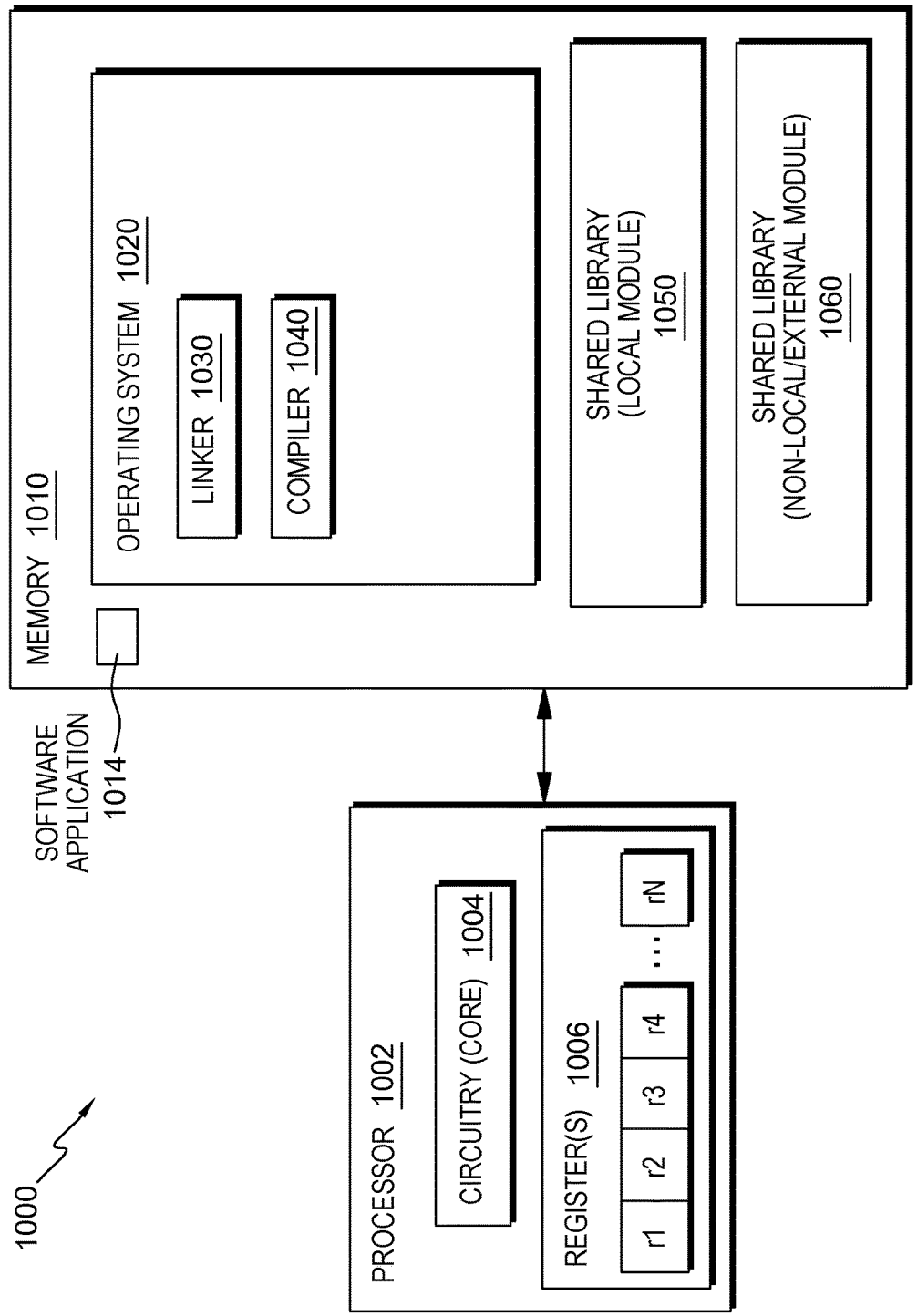
FIG. 10 depicts one embodiment of a computing environment to incorporate and use one or more aspects of the present invention.

One embodiment of a computing environment to incorporate and use one or more aspects of the present invention is described with reference to FIG. 10. A computing environment 1000 includes, for instance, a processor 1002 (e.g., a central processing unit (CPU)) that has one or more processor cores, and each processor core may be referred to as circuitry 1004. Processor 1002 may include one or more registers 1006, and each register is a small amount of storage available as part of a CPU or other digital processor. Data may be loaded into a register 1006 from memory 1010 for arithmetic manipulation by circuitry 1004. Registers 1006 are individually labeled as register 1 (r1) through register N (rN), as an example.

Memory 1010 may include one or more software applications 1014 with program logic to perform various operations, and it may include an operating system 1020. Operating system 1020 may include a linker 1030 (e.g., a static linker) and a compiler 1040. Memory 1010 may also include one or more shared libraries (e.g., local modules) 1050, and/or one or more shared libraries (e.g., external modules) 1060.

In one embodiment, processor 1002 is based on the Power Architecture offered by International Business Machines Corporation. One embodiment of the Power Architecture is described in "Power ISA™ Version 2.07B," International Business Machines Corporation, Apr. 9, 2015, which is hereby incorporated herein by reference in its entirety. In one example, the processor executes an operating system, such as AIX, also offered by International Business Machines Corporation. POWER ARCHITECTURE and AIX are registered trademarks of International Business Machines Corporation, Armonk, N.Y., USA. Other names used herein may be registered trademarks, trademarks, or product names of International Business Machines Corporation or other companies.

In another example, processor 1002 is based on the z/Architecture offered by International Business Machines Corporation, and is part of a server, such as the System z server, which implements the z/Architecture and is also offered by International Business Machines Corporation. One embodiment of the z/Architecture is described in an IBM publication entitled, "z/Architecture Principles of Operation," IBM Publication No. SA22-7832-10, Eleventh Edition, March 2015, which is hereby incorporated herein by reference in its entirety. In one example, the processor executes an operating system, such as z/OS, also offered by International Business Machines Corporation. IBM, Z/OS, and Z/ARCHITECTURE are registered trademarks of International Business Machines Corporation.

In yet a further embodiment, processor 1002 is based on an Intel architecture offered by Intel Corporation. Intel is a registered trademark of Intel Corporation, Santa Clara, Calif. Yet further, processor 1002 may be based on other architectures. The architectures, severs, systems and/or operating systems mentioned herein are merely provided as examples.

Figure 11A:
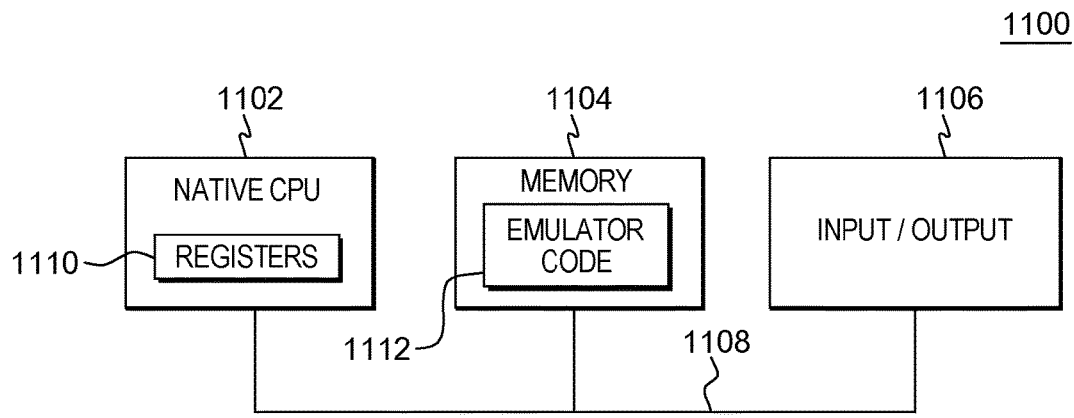
FIG. 11A depicts another embodiment of a computing environment to incorporate and use one or more aspects of the present invention.

Another embodiment of a computing environment to incorporate and use one or more aspects is described with reference to FIG. 11A. In this example, a computing environment 1100 includes, for instance, a native central processing unit 1102, a memory 1104, and one or more input/output devices and/or interfaces 1106 coupled to one another via, for example, one or more buses 1108 and/or other connections. As examples, computing environment 1100 may include a PowerPC processor, a zSeries server, or a pSeries server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Native central processing unit 1102 includes one or more native registers 1110, such as one or more general purpose registers and/or one or more special purpose registers used during processing within the environment. These registers include information that represents the state of the environment at any particular point in time.

Moreover, native central processing unit 1102 executes instructions and code that are stored in memory 1104. In one particular example, the central processing unit executes emulator code 1112 stored in memory 1104. This code enables the processing environment configured in one architecture to emulate another architecture. For instance, emulator code 1112 allows machines based on architectures other than the Power architecture, such as zSeries servers, pSeries servers, HP Superdome servers or others, to emulate the Power architecture and to execute software and instructions developed based on the Power architecture. In a further example, emulator code 1112 allows machines based on architectures other than the z/Architecture, such as PowerPC processors, pSeries servers, HP Superdome servers or others, to emulate the z/Architecture and to execute software and instructions developed based on the z/Architecture. Other architectures may also be emulated.

Figure 11B:
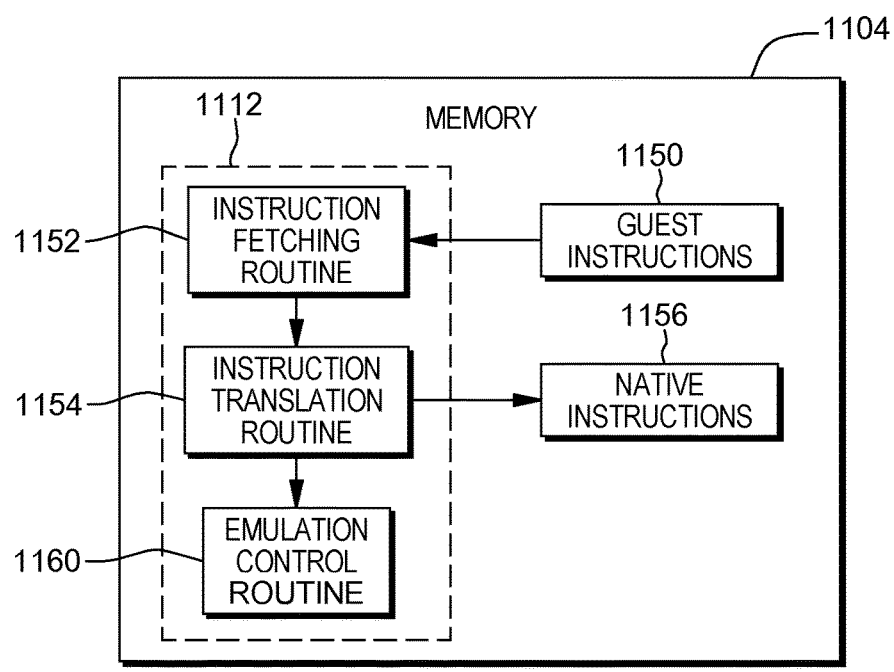
FIG. 11B depicts one embodiment of the memory of FIG. 11A.

Further details relating to emulator code 1112 are described with reference to FIG. 11B. Guest instructions 1150 stored in memory 1104 comprise software instructions (e.g., correlating to machine instructions) that were developed to be executed in an architecture other than that of native CPU 1102. For example, guest instructions 1150 may have been designed to execute on a PowerPC processor or a z/Architecture processor 1002, but instead, are being emulated on native CPU 1102, which may be, for example, an Intel Itanium II processor. In one example, emulator code 1112 includes an instruction fetching routine 1152 to obtain one or more guest instructions 1150 from memory 1104, and to optionally provide local buffering for the instructions obtained. It also includes an instruction translation routine 1154 to determine the type of guest instruction that has been obtained and to translate the guest instruction into one or more corresponding native instructions 1156. This translation includes, for instance, identifying the function to be performed by the guest instruction and choosing the native instruction(s) to perform that function.

Further, emulator code 1112 includes an emulation control routine 1160 to cause the native instructions to be executed. Emulation control routine 1160 may cause native CPU 1102 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 1156 may include loading data into a register from memory 1104; storing data back to memory from a register; or performing some type of arithmetic or logic operation, as determined by the translation routine.

Each routine is, for instance, implemented in software, which is stored in memory and executed by native central processing unit 1102. In other examples, one or more of the routines or operations are implemented in firmware, hardware, software or some combination thereof. The registers of the emulated processor may be emulated using registers 1110 of the native CPU or by using locations in memory 1104. In embodiments, guest instructions 1150, native instructions 1156 and emulator code 1112 may reside in the same memory or may be disbursed among different memory devices.

As used herein, firmware includes, e.g., the microcode, millicode and/or macrocode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

In one example, a guest instruction 1150 is obtained, translated and executed. The instruction, which is of one architecture (e.g., the Power architecture or z/Architecture), is fetched from memory, translated and represented as a sequence of native instructions 1156 of another architecture (e.g., the z/Architecture, Power architecture, Intel architecture, etc.). These native instructions are then executed.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 12:
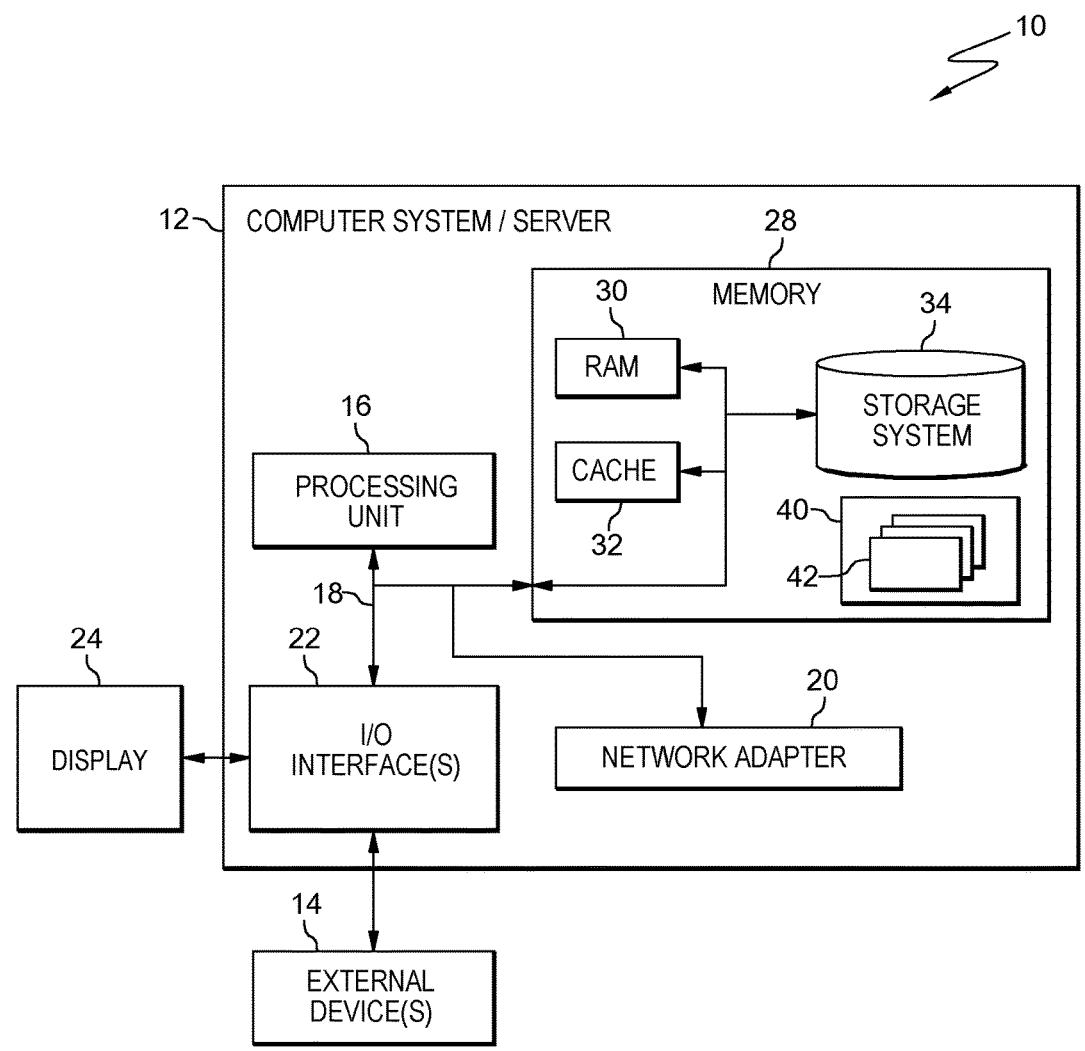
FIG. 12 depicts one embodiment of a cloud computing node.

Referring now to FIG. 12, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 13:
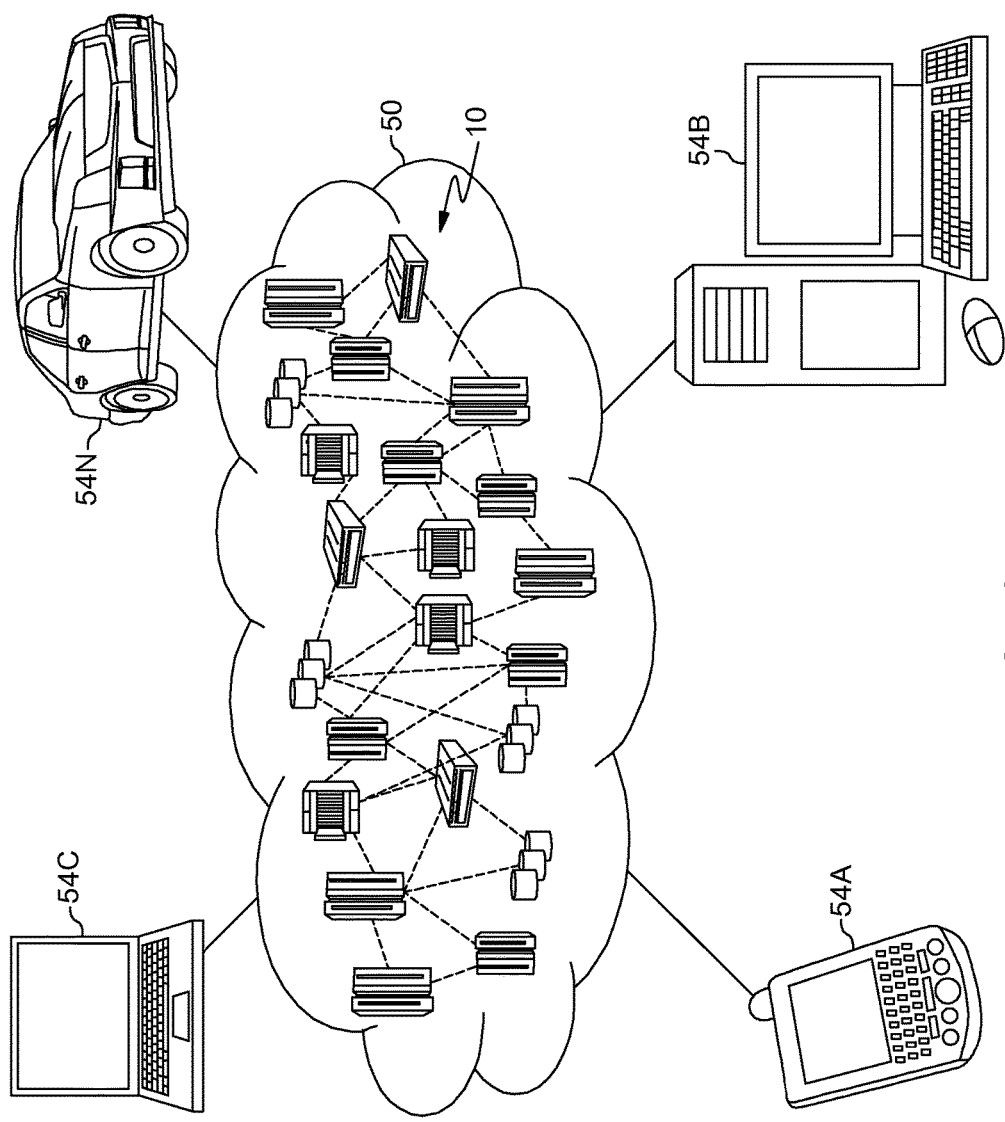
FIG. 13 depicts one embodiment of a cloud computing environment.

Referring now to FIG. 13, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 13 are intended to be illustrative only and that computing nodes 10 and cloud computing environment 50 can communicate with any type of computerized device over any type of network and/or network addressable connection (e.g., using a web browser).

Figure 14:
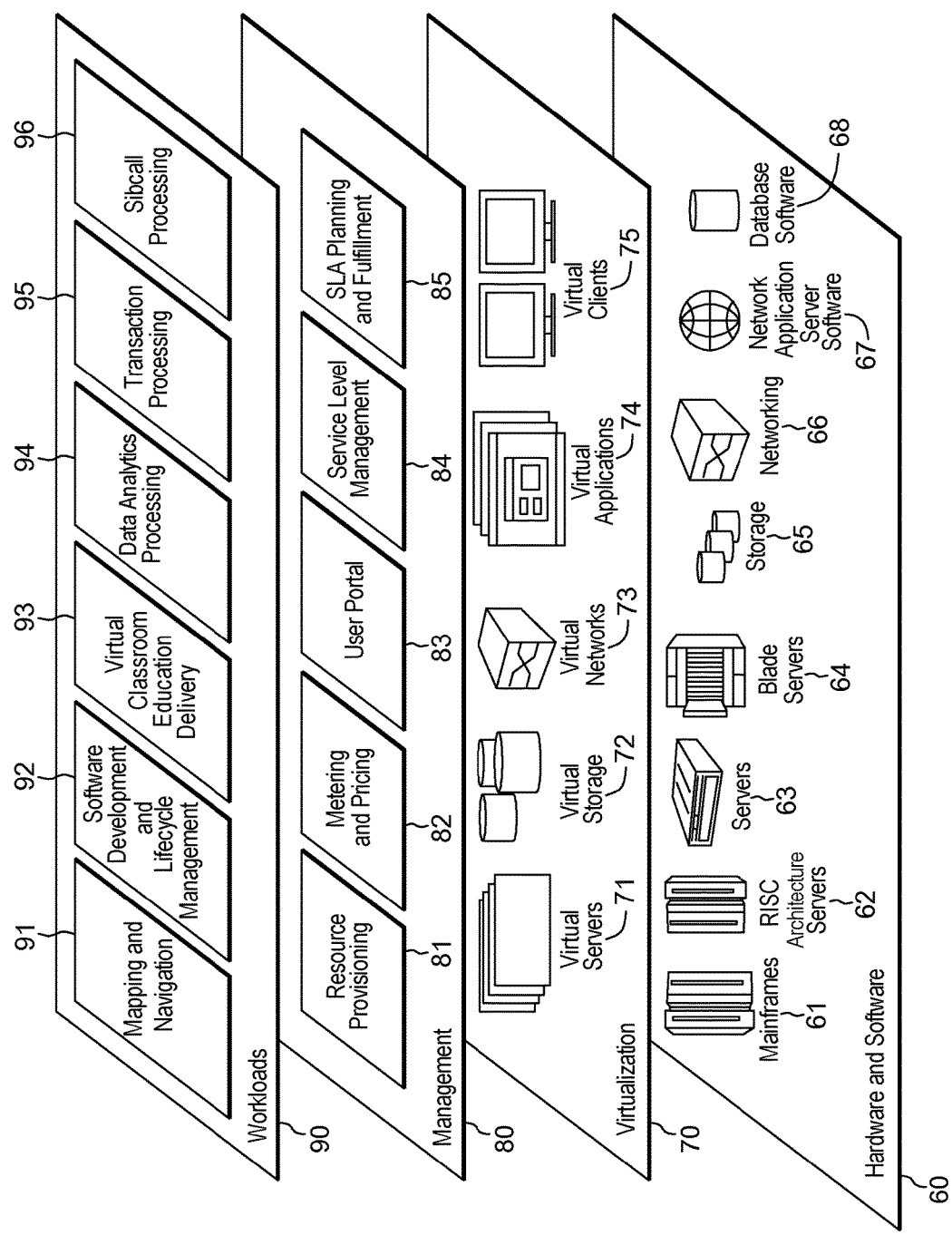
FIG. 14 depicts one example of abstraction model layers.

Referring now to FIG. 14, a set of functional abstraction layers provided by cloud computing environment 50 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and sibling processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing in a computing environment, said computer program product comprising:
   a computer readable storage medium readable by a processing circuit and storing instructions for execution by the processing circuit for performing a method comprising:
      determining whether a routine potentially calls one or more sibling routines, the determining comprising analyzing code searching for a function call in which no further processing of results of a called function is performed by a caller of the called function, and based on locating the function call, the routine is determined to potentially call one or more sibling routines; and
      marking the routine as a sibling caller, based on determining that the routine potentially calls one or more sibling routines, wherein the marking includes adding a pseudo-instruction to the routine, the pseudo-instruction to indicate to a linker executing on a processor of the computing environment that the routine potentially calls one or more sibling routines.

2. The computer program product of claim 1, wherein the method further comprises based on the pseudo-instruction, setting a marker in a symbol data structure indicating that the routine potentially calls one or more sibling routines.

3. The computer program product of claim 1, wherein the method further comprises based on the pseudo-instruction, providing a relocation entry associated with the routine to indicate the routine potentially calls one or more sibling routines.

4. The computer program product of claim 1, wherein the method further comprises:
   determining, by the linker executing on the processor of the computing environment, that the routine is marked as the sibling caller; and
   providing, based on determining the routine is marked as the sibling caller, context to be used based on a sibling routine called by the routine returning to a caller of the routine.

5. The computer program product of claim 4, wherein the context includes information to restore an indicator to a global offset table.

6. The computer program product of claim 1, wherein the routine is in one module and called by a calling routine in the one module.

7. The computer program product of claim 1, wherein the routine is in one module and called by a calling routine in another module.

8. The computer program product of claim 1, wherein the determining and the marking are performed by a compiler.

9. A computer system for facilitating processing in a computing environment, said computer system comprising:
   a memory; and
   a processor in communication with the memory, wherein the computer system is configured to perform a method, said method comprising:
      determining whether a routine potentially calls one or more sibling routines, the determining comprising analyzing code searching for a function call in which no further processing of results of a called function is performed by a caller of the called function, and based on locating the function call, the routine is determined to potentially call one or more sibling routines; and
      marking the routine as a sibling caller, based on determining that the routine potentially calls one or more sibling routines, wherein the marking includes adding a pseudo-instruction to the routine, the pseudo-instruction to indicate to a linker executing on a processor of the computing environment that the routine potentially calls one or more sibling routines.

10. The computer system of claim 9, wherein the method further comprises based on the pseudo-instruction, setting a marker in a symbol data structure indicating that the routine potentially calls one or more sibling routines.

11. The computer system of claim 9, wherein the method further comprises based on the pseudo-instruction, providing a relocation entry associated with the routine to indicate the routine potentially calls one or more sibling routines.

12. The computer system of claim 9, wherein the method further comprises:
   determining, by the linker executing on the processor of the computing environment, that the routine is marked as the sibling caller; and
   providing, based on determining the routine is marked as the sibling caller, context to be used based on a sibling routine called by the routine returning to a caller of the routine.

13. The computer system of claim 9, wherein the routine is in one module and called by a calling routine in the one module.

14. The computer system of claim 9, wherein the routine is in one module and called by a calling routine in another module.

15. A computer-implemented method of facilitating processing in a computing environment, said computer-implemented method comprising:
   determining whether a routine potentially calls one or more sibling routines, the determining comprising analyzing code searching for a function call in which no further processing of results of a called function is performed by a caller of the called function, and based on locating the function call, the routine is determined to potentially call one or more sibling routines; and marking the routine as a sibling caller, based on determining that the routine potentially calls one or more sibling routines, wherein the marking includes adding a pseudo-instruction to the routine, the pseudo-instruction to indicate to a linker executing on a processor of the computing environment that the routine potentially calls one or more sibling routines.

16. The computer-implemented method of claim 15, further comprising based on the pseudo-instruction, setting a marker in a symbol data structure indicating that the routine potentially calls one or more sibling routines.

17. The computer-implemented method of claim 15, further comprising based on the pseudo-instruction, providing a relocation entry associated with the routine to indicate the routine potentially calls one or more sibling routines.

18. The computer-implemented method of claim 15, further comprising:

determining, by the linker executing on the processor of the computing environment, that the routine is marked as the sibling caller; and providing, based on determining the routine is marked as the sibling caller, context to be used based on a sibling routine called by the routine returning to a caller of the routine.

19. The computer-implemented method of claim 15, wherein the routine is in one module and called by a calling routine in the one module.

20. The computer-implemented method of claim 15, wherein the routine is in one module and called by a calling routine in another module.

* * * * *